(12) United States Patent
Tsuji et al.

(10) Patent No.: US 8,247,506 B2
(45) Date of Patent: Aug. 21, 2012

(54) PTFE POWDER AND METHOD OF PRODUCING PTFE MOLDING POWDERS

(75) Inventors: Masayuki Tsuji, Settsu (JP); Michio Asano, Settsu (JP); Masamichi Sukegawa, Settsu (JP)

(73) Assignee: Daiken Industries, Ltd., Osaka (JP)

( * ) Notice: Subject to any disclaimer, the term of this patent is extended or adjusted under 35 U.S.C. 154(b) by 594 days.

(21) Appl. No.: 12/101,064

(22) Filed: Apr. 10, 2008

(65) Prior Publication Data

US 2008/0199699 A1 Aug. 21, 2008

Related U.S. Application Data

(62) Division of application No. 10/493,762, filed as application No. PCT/JP02/11035 on Oct. 24, 2002, now abandoned.

(30) Foreign Application Priority Data

Oct. 24, 2001 (JP) .................................. 2001-327017
Oct. 24, 2001 (JP) .................................. 2001-327018

(51) Int. Cl.
*C08F 214/18* (2006.01)
(52) U.S. Cl. .......................... 526/250; 524/544; 428/402
(58) Field of Classification Search .................. 526/250; 524/544; 428/402
See application file for complete search history.

(56) References Cited

U.S. PATENT DOCUMENTS

| | | | |
|---|---|---|---|
| 3,953,412 A | 4/1976 | Saito et al. | |
| 4,036,718 A | 7/1977 | Brown et al. | |
| 4,241,137 A | 12/1980 | Izumo et al. | |
| 6,013,700 A | 1/2000 | Asano et al. | |
| 6,054,083 A | 4/2000 | Asano et al. | |
| 6,350,801 B1 * | 2/2002 | Asano et al. | 524/377 |
| 6,790,932 B2 * | 9/2004 | Kapeliouchko et al. | 528/480 |
| 2002/0107320 A1 | 8/2002 | Kuroki et al. | |
| 2002/0183451 A1 * | 12/2002 | Sukegawa et al. | 525/190 |
| 2003/0004257 A1 * | 1/2003 | Kondo et al. | 524/495 |
| 2003/0122318 A1 * | 7/2003 | Yanagiguchi et al. | 277/534 |

FOREIGN PATENT DOCUMENTS

| | | |
|---|---|---|
| EP | 0794213 A2 | 9/1997 |
| EP | 808847 A1 * | 11/1997 |
| EP | 0 844 271 | 5/1998 |
| EP | 844271 A1 * | 5/1998 |
| EP | 0 969 034 | 1/2000 |
| EP | 0 969 035 | 1/2000 |
| EP | 0 970 986 | 1/2000 |
| EP | 0 980 887 | 2/2000 |
| EP | 1 449 866 A1 | 8/2004 |
| GB | 1 428 838 | 3/1976 |
| GB | 1426838 * | 3/1976 |
| JP | 6-73189 | 3/1994 |
| JP | 7-11088 | 1/1995 |

(Continued)

*Primary Examiner* — Peter D. Mulcahy
*Assistant Examiner* — Henry Hu
(74) *Attorney, Agent, or Firm* — Sughrue Mion, PLLC

(57) ABSTRACT

This invention provides a polytetrafluoroethylene powder capable of giving moldings which are improved in surface roughness Ra, tensile strength and/or tensile elongation as compared with the prior art ones and can be excellent in dielectric breakdown strength and, further, can be excellent, if desired, in apparent density and/or powder flowability as well, and a method of producing a polytetrafluoroethylene molding powder. The present invention is a PTFE powder wherein a surface roughness Ra of molded articles a1 for measurement is less than 0.92 μm.

3 Claims, 4 Drawing Sheets

FOREIGN PATENT DOCUMENTS

| | | |
|---|---|---|
| JP | 7-11088 A | 1/1995 |
| JP | 7-295289 A | 11/1995 |
| JP | 8-245723 | 9/1996 |
| JP | 08-245723 * | 9/1996 |
| JP | 9-52955 | 2/1997 |
| JP | 10-147617 A | 6/1998 |
| JP | 10-259252 | 9/1998 |
| JP | 10-316763 | 12/1998 |
| JP | 2002-234945 | 8/2002 |
| WO | 93/16126 | 8/1993 |
| WO | 94/19162 A1 | 9/1994 |
| WO | 96/28498 | 9/1996 |
| WO | 9628498 A1 | 9/1996 |

* cited by examiner

PTFE POWDER AND METHOD OF PRODUCING PTFE MOLDING POWDERS

CROSS-REFERENCE TO RELATED APPLICATIONS

This is a Divisional of application Ser. No. 10/493,762 filed Apr. 26, 2004, now abandoned which is a 371 of PCT Application No. PCT/JP02/11035 filed Oct. 24, 2002, the above-noted applications incorporated herein by reference in their entirety.

TECHNICAL FIELD

The present invention relates to a polytetrafluoroethylene powder capable of giving moldings which are improved in surface smoothness, tensile strength and/or tensile elongation as compared with the prior art ones and can be excellent in dielectric breakdown strength and, further, can be excellent, if desired, in apparent density and/or powder flowability as well, and to a method of producing polytetrafluoroethylene (PTFE) molding powders.

BACKGROUND ART

Polytetrafluoroethylene (PTFE) is a thermoplastic resin excellent in heat resistance, chemical resistance, weather resistance, electrical insulation properties and nontackiness, among others, and is useful in a wide range of fields of application. However, it is very high in melt viscosity, so that it has been regarded as impossible to mold the resin by applying ordinary plastics molding processes used in molding general thermoplastic resins low in melt viscosity, such as conventional extrusion molding and injection molding techniques.

Thus, the sinter molding technique has been commonly used in molding PTFE in place of general plastics molding processes. In sinter molding of a resin, the resin in a molding powder form is preformed and the preform obtained is heated to a temperature not lower than the melting point of the resin to thereby sinter the resin particles.

The method of sinter molding of PTFE includes the compression molding, ram extrusion and other techniques.

The compression molding technique generally comprises filling PTFE in a molding powder form into a mold, compressing the same, placing the preform obtained in an oven and sintering the same, followed by cooling to complete the molding process.

The ram extrusion molding technique comprises feeding PTFE in a molding powder form intermittently into a cylinder at one end thereof, pressing each feed portion into cylinder by using a piston (ram) and causing the portion to descend and be combined with the preceding pressed-into portion, and extruding the continuous body resulting from fusion by sintering, with cooling, from the other end of the cylinder.

When a PTFE powder obtained by grinding just after polymerization is used as the molding powder in such techniques of sinter molding of PTFE, void-free, compact moldings are generally obtained with ease, and the physical characteristics, such as surface smoothness, tensile strength, tensile elongation and high-voltage insulation properties, of the moldings tend to be good.

On the other hand, the PTFE powder ground just after polymerization is generally inferior in such powder characteristics as apparent density and powder flowability and, therefore, the molding powder tends to aggregate in the hopper or small-diameter cylinder of the molding machine, causing bridging or uneven filling in the mold or cylinder, hence the handleability tends to become unsatisfactory.

Further, the PTFE powder ground just after polymerization is low in apparent density and bulky per unit weight, so that it is not easy to reduce the size of the mold or cylinder. It is thus difficult to increase the productivity per mold or cylinder; this is disadvantageous.

Granulation is a conceivable means for increasing the apparent density and/or powder flowability of the PTFE powder ground just after polymerization. However, although the granules obtained are improved in apparent density and powder flowability, shearing forces have been applied thereon in the step of granulation, diminishing the physical properties of the final product moldings; another problem thus arises.

For the purpose of improving the powder flowability and apparent density, Japanese Kokai publication Hei-07-011088 discloses PTFE-based granules prepared from a filler and a PTFE powder having an average particle diameter of not larger than 20 μm as the raw materials, but it does not describe that the moldings may have good physical characteristics.

As regards the method of granulation of PTFE, Japanese Kokai publications Hei-10-259252 and Hei-10-316763, for instance, disclose the method comprising granulating, in water in the presence of a surfactant, a PTFE powder just after suspension polymerization of 99 to 99.999 mole percent of tetrafluoroethylene and 1 to 0.001 mole percent of a perfluorovinylether or a pulverization product derived therefrom, with an average particle diameter of less than 100 μm.

Thus, PTFE molding powders having good powder characteristics tend to give moldings poor in physical characteristics, while PTFE molding powders capable of giving moldings having good physical characteristics tend to have poor powder characteristics. Therefore, selection has generally been made according to which characteristics are regarded as more important in view of the intended use.

For example, in the case of general-purpose products to be mass produced, such as ball valve seats, the handleability and/or workability in the step of molding has been regarded as more important than the physical characteristics of the moldings, hence molding powders having good powder characteristics have been selected even if the physical properties of the moldings are more or less inferior. However, even such general-purpose moldings are desired to improve physical characteristics.

For improving the physical characteristics of moldings by reducing the residual impurity content, WO 96/28498 discloses a method of producing PTFE molding powders which is characterized in that crude PTFE particles obtained by suspension polymerization are pulverized in a wet condition and then washed.

For improving the flexural fatigue resistance as a physical characteristic, WO 93/16126, for instance, discloses PTFE molding powders having a heat of crystallization of 18.0 to 25.0 J/g as determined by using a differential scanning colorimeter [DSC], a specific surface area of 0.5 to 9.0 $M^2$/g, an average particle diameter of not larger than 100 μm and a perfluoro(alkylvinylether) unit content of 0.01 to 1% by weight and capable of giving moldings having a flex life and a creep resistance with respective specified ranges. However, it has no description of such characteristics as surface roughness Ra tensile strength, tensile elongation, and powder flowability. It does not describe any method of pulverization, either.

The PTFE moldings whose physical characteristics are regarded as more important than the powder characteristics include, among others, the so-called large-sized moldings generally having a diameter not smaller than 200 mm, for instance. Such large-sized moldings are in great need from the viewpoint of economy. However, because of their large size, there is a limit to the pressure in the step of preforming. It is therefore necessary to obtain moldings having at least certain levels of physical characteristics by applying a relatively low pressure even if the powder characteristics are more or less poor.

In recent years, the range of application of PTFE has been expanded to the field of semiconductor production, for instance, so that PTFE is now used in the production of insulating seals, insulating nozzles and other high-voltage insulating materials. In semiconductor-related fields, the moldings are required, from the nature thereof, to have high-level physical characteristics, for example good dielectric breakdown strength. Further, any procedure of cutting thereof is not desirable for the prevention of product contamination but, on the other hand, they are required to show surface smoothness.

SUMMARY OF THE INVENTION

In view of the state of the art as discussed above, it is an object of the present invention to provide a polytetrafluoroethylene powder capable of giving moldings which are improved in surface roughness Ra tensile strength and/or tensile elongation as compared with the prior art ones and can be excellent in dielectric breakdown strength and, further, can be excellent, if desired, in apparent density and/or powder flowability as well, and a method of producing a polytetrafluoroethylene molding powder.

The present invention provides a PTFE powder wherein a surface roughness Ra of molded articles a1 for measurement is less than 0.92 μm.

The present invention provides a polytetrafluoroethylene powder wherein an apparent density is not lower than 0.45 g/cm$^3$ and a surface roughness Ra of molded articles a1 for measurement is less than 1.9 μm.

The present invention provides a polytetrafluoroethylene powder wherein a flowability is not less than 0.5 times and a surface roughness Ra of molded articles a1 for measurement is less than 1.9 μm.

The present invention provides a polytetrafluoroethylene powder wherein a flowability is not less than 0.5 times, an apparent density is not lower than 0.45 g/cm$^3$ and a surface roughness Ra of molded articles a1 for measurement is less than 1.9 μm.

The present invention provides a polytetrafluoroethylene powder wherein an apparent density is not lower than 0.45 g/cm$^3$ and a breakdown voltage of molded articles a2 for measurement is not lower than 9.1 kV.

The present invention provides a polytetrafluoroethylene powder wherein a flowability is not less than 0.5 times and a breakdown voltage of molded articles a2 for measurement is not lower than 9.1 kV.

The present invention provides a polytetrafluoroethylene powder wherein a flowability is not less than 0.5 times, an apparent density is not lower than 0.45 g/cm$^3$ and a breakdown voltage of molded articles a2 for measurement is not lower than 9.1 kV.

The present invention provides a polytetrafluoroethylene powder wherein a tensile strength of molded articles a3 for measurement is not less than 58.7 MPa.

The present invention provides a polytetrafluoroethylene powder wherein a tensile elongation of molded articles a3 for measurement is not less than 556%.

The present invention provides a polytetrafluoroethylene powder wherein an apparent density is not lower than 0.45 g/cm$^3$ and a tensile elongation of molded articles a3 for measurement is not less than 431%.

The present invention provides a polytetrafluoroethylene powder wherein a surface roughness Ra of molded articles a1 for measurement is less than 1.5 μm and a tensile strength of molded articles a3 for measurement is not less than 47.8 MPa.

The present invention provides a polytetrafluoroethylene powder wherein a surface roughness Ra of molded articles a1 for measurement is less than 1.2 μm and a tensile elongation of molded articles a3 for measurement is not less than 423%.

The present invention provides a polytetrafluoroethylene powder wherein an apparent density is not lower than 0.45 g/cm$^3$, a surface roughness Ra of molded articles a1 for measurement is less than 2.4 μm and a tensile elongation of molded articles a3 for measurement is not less than 370%.

The present invention provides a polytetrafluoroethylene powder wherein a flowability is not less than 0.5 times, a surface roughness Ra of molded articles a1 for measurement is less than 2.4 μm and a tensile elongation of molded articles a3 for measurement is not less than 370%.

The present invention provides a polytetrafluoroethylene powder wherein a flowability is not less than 0.5 times, an apparent density is not lower than 0.45 g/cm$^3$, a surface roughness Ra of molded articles a1 for measurement is less than 2.4 μm and a tensile elongation of molded articles a3 for measurement is not less than 370%.

The present invention provides a polytetrafluoroethylene powder wherein a surface roughness Ra of molded articles a1 for measurement is less than 0.92 μm and a breakdown voltage of molded articles a2 for measurement is not lower than 10 kV.

The present invention provides a polytetrafluoroethylene powder wherein an apparent density is not lower than 0.45 g/cm$^3$, a surface roughness Ra of molded articles a1 for measurement is less than 2.5 μm and a breakdown voltage of molded articles a2 for measurement is not lower than 8.5 kV.

The present invention provides a polytetrafluoroethylene powder wherein a flowability is not less than 0.5 times, a surface roughness Ra of molded articles a1 for measurement is less than 2.5 μm and a breakdown voltage of molded articles a2 for measurement is not lower than 8.5 kV.

The present invention provides a polytetrafluoroethylene powder wherein a flowability is not less than 0.5 times, an apparent density is not lower than 0.45 g/cm$^3$, a surface roughness Ra of molded articles a1 for measurement is less than 2.5 μm and a breakdown voltage of molded articles a2 for measurement is not lower than 8.5 kV.

The present invention provides a polytetrafluoroethylene powder wherein a tensile strength of molded articles a3 for measurement is not less than 47.8 MPa and a tensile elongation of molded articles a3 for measurement is not less than 451%.

The present invention provides a polytetrafluoroethylene powder wherein a breakdown voltage of molded articles a2 for measurement is not lower than 11.5 kV and a tensile strength of molded articles a3 for measurement is not less than 47.8 MPa.

The present invention provides a polytetrafluoroethylene powder wherein a breakdown voltage of molded articles a2 for measurement is not lower than 10 kV and a tensile elongation of molded articles a3 for measurement is not less than 556%.

The present invention provides a polytetrafluoroethylene powder wherein a surface roughness Ra of molded articles a1 for measurement is less than 1.2 μm, a tensile strength of molded articles a3 for measurement is not less than 47.8 MPa and a tensile elongation of molded articles a3 for measurement is not less than 423%.

The present invention provides a polytetrafluoroethylene powder wherein a breakdown voltage of molded articles a2 for measurement is not lower than 10 kV, a tensile strength of molded articles a3 for measurement is not less than 47.8 MPa and a tensile elongation of molded articles a3 for measurement is not less than 451%.

The present invention provides a method of producing a polytetrafluoroethylene molding powder by pulverizing an unpulverized polytetrafluoroethylene powder wherein the unpulverized polytetrafluoroethylene powder comprises a polytetrafluoroethylene-based polymer obtained by suspension polymerization, the polytetrafluoroethylene-based polymer comprises a non-modified polytetrafluoroethylene and/or a modified polytetrafluoroethylene and the pulverization is carried without causing substantial fibril-formation from the resulting particles.

DETAILED DISCLOSURE OF THE INVENTION

In the following, the present invention is described in detail.

The present invention relates to a polytetrafluoroethylene powder [PTFE powder].

In this specification, the term "polytetrafluoroethylene" is hereinafter sometimes referred to also as "PTFE". However, the latter is a mere abbreviation for the above term "polytetrafluoroethylene".

The "PTFE powder" so referred to herein means a powdery solid comprising a PTFE-based polymer and having physical characteristics of moldings or having physical characteristics of moldings and powder characteristics.

The above-mentioned "PTFE-based polymer" comprises a modified PTFE and/or a not-modified PTFE.

In this specification, the "powdery solid comprising a PTFE-based polymer" is sometimes referred to also as "PTFE powder" for short. Unless clearly specified by saying the PTFE powder of the present invention, the PTFE molding powder, which is to be described later herein, or the unpulverized PTFE powder, which is to be described later herein, however, the above term or abbreviation refers to an ordinary powdery solid comprising a PTFE-based polymer not limited to the PTFE powder of the present invention, the PTFE molding powder to be described later herein or the unpulverized PTFE powder to be described later herein.

In this specification, the terminology "ordinary powdery solid" means a virgin polymer just obtained by polymerization and/or the product derived therefrom by rough grinding, washing, drying, pulverizing and granulating treatments.

In this specification, the terminology "virgin polymer just obtained by polymerization" means a powder comprising the polymer just obtained by polymerization but not yet subjected to particular treatment(s), namely washing, rough grinding, drying, pulverization, granulation and/or heating to the melting point of the PTFE-based polymer or a higher temperature thereof after recovery from the polymerization mixture.

The PTFE powder of the present invention, when molded, can give moldings excellent in surface roughness Ra tensile strength [TS] and/or tensile elongation [EL] and more improved in surface roughness Ra tensile strength or tensile elongation as compared with the conventional PTFE powders and further, the PTFE powder, when desired, can be excellent in apparent density and/or powder flowability.

The PTFE powder of the present invention, when molded, can give moldings excellent in breakdown voltage [BDV] and further, excellent in surface roughness Ra tensile strength and/or tensile elongation, as desired, and the PTFE powder can be excellent in apparent density and/or powder flowability as well.

In this specification, the surface roughness Ra breakdown voltage, tensile strength and/or tensile elongation are sometimes referred to collectively as "physical characteristics of moldings". In this specification, the apparent density and/or powder flowability are sometimes referred to collectively as "powder characteristics".

In this specification, the surface roughness Ra values given are the values measured with molded articles a1 for measurement, the breakdown voltage values are the values measured with molded articles a2 for measurement, and the tensile strength and tensile elongation values are the values measured with molded articles a3 for measurement. In the case of the PTFE powder of the present invention, the molded articles a1 for measurement, molded articles a2 for measurement and molded articles a3 for measurement are the moldings obtained by using the PTFE powder of the present invention as the PTFE powder according to the respective physical characteristics of moldings measurement methods to be described below.

The PTFE powder of the present invention can give molded articles a1 for measurement which have a surface roughness of less than 2.5 μm, for instance, and the moldings in general as obtained from the PTFE powder of the present invention can have such surface smoothness that the surface is not very uneven. Therefore, the PTFE powder of the present invention which gives moldings low in surface roughness Ra can be advantageously used in producing moldings desired to have surface smoothness, for example ball valve seats and the like.

The PTFE powder of the present invention which gives moldings low in surface roughness Ra can give moldings with good surface smoothness, so that such a surface smoothening treatment as cutting, which may be required in the prior art, is not needed in certain instances. Therefore, it can be advantageously used in producing moldings desired to have surface smoothness, the production process for which does not include any cutting step, for example non-cut seal rings.

The PTFE powder of the present invention which gives moldings low in surface roughness Ra can give moldings requiring no cutting or other surface smoothening treatment in many cases. In such cases, it can be advantageously used in forming those devices or mechanisms, parts and like moldings which are to be used in the field of semiconductor manufacture where it is required to prevent contamination by cutting chips or other impurities. The moldings to be used in the field of semiconductor manufacture are not particularly restricted but include, among others, large-sized sheets to be used in the manufacture of semiconductors, various square vessels, sliding pats and so forth. Such large-sized sheets are also called meter-square sheets.

The surface roughness Ra of molded articles a1 for measurement can be preferably less than 1.9 μm, more preferably less than 1.2 μm, still more preferably less than 0.8 μm, and can be adjusted within such range according to the intended use. Generally, the surface roughness Ra may be not less than 0.5 μm, for example not less than 0.55 μm, if it is within the above range.

In this specification, the surface roughness is the value obtained by filling 210 g of a PTFE powder in a mold with a diameter of 50 mm, maintaining the powder under a molding pressure of 29.4 MPa (300 kgf/cm$^2$ G) for 5 minutes, heating the thus-obtained preform from room temperature to 365° C.

at a heating rate of 50° C./hour, maintaining the same at 365° C. for 5.5 hours, then cooling the resulting molding at a cooling rate of 50° C./hour, and measuring the upper surface roughness of the molding by the center-line mean roughness (Ra) method according to JIS B 0601 with a Tokyo Seimitsu Kikai's surface roughness meter. In this specification, the moldings used for such measurement are referred to also as "molded articles a1 for measurement".

The PTFE powder of the present invention can give molded articles a2 for measurement which show a breakdown voltage of not lower than 8.5 kV, for instance, so that the moldings in general as obtained from the PTFE powder of the present invention can have good high-voltage insulation properties. Therefore, the PTFE powder of the present invention can be advantageously used in molding, for example, high-voltage insulating materials, such as insulating tapes or insulating seals for high-voltage transformer capacitors, insulating nozzles for breakers, and so forth.

The breakdown voltage of molded articles a2 for measurement can reach a level preferably not lower than 9.1 kV, more preferably not lower than 10 kV, still more preferably not lower than 12 kV, in particular preferably not lower than 13 kV, and can be adjusted within the above range according to the intended use. Generally, the breakdown voltage may be not higher than 18 kV, for example not higher than 15 kV or, further, not higher than 14 kV, provided that it is within the range mentioned above.

In this specification, the breakdown voltage is the value obtained by filling 210 g of a PTFE powder in a mold with a diameter of 50 mm, maintaining the powder under a molding pressure of 29.4 MPa (300 kgf/cm$^2$ G) for 5 minutes, heating the thus-obtained preform (about 50 mm in diameter and 50 mm in thickness) from room temperature to 365° C. at a heating rate of 50° C./hour, maintaining the same at 365° C. for 5.5 hours, then cooling the molding at a cooling rate of 50° C./hour, preparing 0.1-mm-thick skived sheets from the resulting molding by cutting, and subjecting the skived sheets to measurement according to JIS K 6891. In this specification, the 0.1-mm-thick skived sheets used for such measurement are referred to also as "molded articles a2 for measurement".

The PTFE powder of the present invention can give molded articles a3 for measurement which show a tensile strength of not less than 47.8 MPa, for instance, so that the moldings in general as obtained from the PTFE powder of the present invention can show high mechanical strength characteristics upon application of a tensile force thereto.

Therefore, the PTFE powder of the present invention can be advantageously used, for example, in forming seal rings and other moldings desired to show high strength characteristics upon stretching for insertion thereof into machines, apparatus and so forth. Any of seal rings can be adequately used; seal rings having a cut site and to be deformed on the occasion of their insertion into devices or mechanisms and those having no cut site, occurring like rubber bands and thus belonging to the so-called endless type.

The PTFE powder of the present invention can give moldings excellent in mechanical strength characteristics in particular, and therefore can be used in forming, for example ball valve seats, moldings required to be high in tensile strength.

The tensile strength of molded articles a3 for measurement can amount to a level preferably not lower than 50 MPa, more preferably not lower than 58.7 MPa, still more preferably not lower than 60 MPa, in particular preferably not lower than 65 MPa, and can be adjusted within the above range according to the intended use. Generally, the tensile strength may be not higher than 70 MPa, for example not higher than 66 MPa, provided that it is within the above range.

The PTFE powder of the present invention can give molded articles a3 for measurement with a tensile elongation of not less than 370%, for instance, so that the moldings in general as obtained from the PTFE powder of the present invention can show a high level of elongation upon stretching and, even when a tensile force is applied thereto on the occasion of mounting thereof on machines/apparatus and so forth and/or of processing thereof, they can be prevented from being broken.

Therefore, the PTFE powder of the present invention can be advantageously used in seal rings and other moldings desired to show a high level of elongation on the occasion of insertion thereof into devices or mechanisms, etc. The seal rings may be either ones having a cut site or ones having no cut site, as mentioned above referring to the tensile strength. With the latter, however, their superiority in tensile elongation can be fully utilized.

The tensile elongation of the testing moldings 3a can reach a level preferably not less than 450%, more preferably not less than 500%, still more preferably not less than 550%, in particular preferably not less than 600%, and can be adjusted within the above range according to the intended use. Generally, the tensile elongation may be not more than 650%, for example not more than 630%, provided that it is within the above range.

In this specification, the tensile strength and tensile elongation values given are the values obtained by filling a mold, 50 mm in diameter, with 210 g of a PTFE powder, maintaining the powder under a molding pressure of 300 kgf/cm$^2$ G for 5 minutes, heating the thus-obtained preform (about 50 mm in diameter and 50 mm in thickness) from room temperature to 365° C. at a heating rate of 50° C./hour, maintaining the same at 365° C. for 5.5 hours, then cooling the molding at a cooling rate of 50° C./hour, preparing 0.3-mm-thick skived sheets by cutting the molding obtained, punching JIS dumbbell No. 3 test specimens out of the skived sheets, stretching the test specimens at a pulling rate of 200 mm/minute according to JIS K 6891-58 with an autograph with a full load of 500 kg, and measuring the stress and elongation at rupture, respectively. In this specification, the moldings used for such measurements are referred to also as "molded articles a3 for measurement".

The PTFE powder of the present invention is thus excellent in physical characteristics of moldings, namely surface roughness Ra, breakdown voltage, tensile strength and/or tensile elongation and, when desired, can be excellent also in powder characteristics, namely powder flowability and/or apparent density. In this specification, the powder flowability is expressed in terms of the flowability obtained by the measurement method to be described below.

The PTFE powder of the present invention can have a flowability of not less than 0.5 times, for instance. Therefore, it will not cause bridging due to aggregation of the molding powder in the hopper or small-diameter cylinder of the molding machine or uneven filling in the mold or cylinder, hence its handleability can be improved.

Preferably, the flowability of the PTFE powder of the present invention can amount to a level of 4 times or above. In view of the measurement method to be described later herein, the flowability of the PTFE powder of the present invention is at most 8 times and, generally, it may be not more than 8 times, for example not more than 6 times, if it is within the range mentioned above.

In this specification, the flowability is the value obtained by the method described below, which is based on the method disclosed in Japanese Kokai Publication Hei-03-259925, for instance. In the case of the PTFE powder of the present invention, the measurement method described below is carried out by using the PTFE powder of the present invention as the test powder. Thus, the test apparatus comprises an upper hopper 31 and a lower hopper 32 each supported by a supporting member 42 with the center lines of the both hoppers coinciding with each other, as shown in FIG. 1. In the upper hopper 31, the entrance 33 has a diameter of 74 mm, the outlet 34 has a diameter of 12 mm, and the height from entrance 33 to outlet 34 is 123 mm. The outlet 34 is equipped with a stopper plate 35, which can properly retain the powder therein or allow the powder to fall. In the lower hopper 32, the entrance 36 has a diameter of 76 mm, the outlet 37 has a diameter of 12 mm, the height from entrance 36 to outlet 37 is 120 mm and, like in the upper hopper, the outlet 37 is equipped with a stopper plate 38. The distance between the upper and lower hoppers is adjusted so that the distance between both stopper plates may become 15 cm. In FIG. 1, the numbers 39 and 40 each indicates an outlet cover for each hopper, and the number 41 indicates a reservoir for the falling powder.

Whether the powder flowability is "good" or "not good" is first judged and, according to the thus-obtained judgment result, the flowability is determined by the method described below.

About 200 g of the test powder is allowed to stand in a room conditioned at 23.5 to 24.5° C. for at least 4 hours and then sieved through a 10-mesh sieve (mesh size 1,680 micrometers), and the powder flowability measurement is carried out as follows.

(i) First, the test powder, in an amount of just a cupful (30-cc cup), is placed in the upper hopper 31, and the stopper plate 35 is immediately drawn out to allow the test powder to fall into the lower hopper. If the powder will not fall, the powder is caused to fall by picking with a wire. After falling of the whole amount of the test powder into the lower hopper 32 and the subsequent 15±2 seconds of standing, the stopper plate 38 of the lower hopper is drawn out, and observation is made as to whether the test powder flows down through the outlet 37 or not. In the case of successful flow-down of the whole amount within 8 seconds, the powder is judged as capable of falling.

(ii) The above measurement is repeated three times and, when successful flow-down is observed in at least two out of the three measurements, the powder is judged to have "good" in powder flowability. When the powder fails to flow down in all the three measurements, the powder is judged to be "not good" in powder flowability. When falling is observed in only one of the three measurements, the same measurement is repeated two more times and, when falling is observed in both the additional measurements, the test powder is ultimately judged to be "good" in powder flowability. Otherwise, the powder flowability is judged as "not good".

(iii) When the test powder is judged to have "good" in powder flowability, an amount thereof just filling two 30-cc cups is placed in the upper hopper and subjected to the same measurement as described above. When the powder flowability is found "good", the measurement procedure is repeated with increasing the number of cupfuls of the test powder portion to be added until the result "not good" is obtained or until a maximum of 8 cupfuls of the test powder is used. In each measurement, the test powder portion that has flowed down from the lower hopper in the preceding measurement may be reused.

(iv) In the above measurements, it becomes more and more difficult for the PTFE powder to fall down as the amount to be used increases. Therefore, the "flowability" of the test powder is defined as the number of cupfuls at "not good" in the powder flowability minus one.

The PTFE powder of the present invention can have an apparent density of not lower than 0.45 g/cm³ and, therefore, not only the handleability can be improved, like the above-mentioned case of improved powder flowability, but the molding powder volume per unit weight can be reduced, so that the mold and/or cylinder of the molding machine can be made small and the productivity per mold or cylinder can be improved.

The apparent density of the PTFE powder of the present invention can favorably be made not less than 0.5 g/cm³, more preferably not lower than 0.6 g/cm³, still more preferably not lower than 0.7 g/cm³, in particular preferably not lower than 0.8 g/cm³. The apparent density of the PTFE powder of the present invention may generally be not higher than 1 g/cm³, for example not higher than 0.92 g/cm³ or, further, not higher than 0.85 g/cm³, provided that it is within the range mentioned above.

In this specification, the apparent density value is the value by carrying out the measurement according to JIS K 6891-5.3.

The PTFE powder of the present invention is a powdery solid comprising a PTFE-based polymer, as mentioned above. The PTFE-based polymer comprises a modified PTFE and/or a not-modified PTFE, as mentioned above.

Therefore, the PTFE powder of the present invention may comprise a not-modified PTFE alone, a modified PTFE alone, or both a not-modified PTFE and a modified PTFE, or may be a mixture of those with a filler, an additive and so forth.

In this specification, the "modified PTFE" means a copolymer obtained by copolymerizing tetrafluoroethylene [TFE] and a small proportion of at least one other comonomer as the monomer components.

In this specification, the term "not-modified PTFE" means a homopolymer of TFE obtained by polymerizing TFE but no other comonomer as the monomer component.

The other comonomer is not particularly restricted but may be any of the comonomers copolymerizable with TFE, including perfluoroolefins such as hexafluoropropene [HFP]; chlorotrifluoroethylene [CTFE]; trifluoroethylene; and perfluorovinylethers, among others.

The perfluorovinylether is not particularly restricted but includes, among others, perfluoro unsaturated compounds represented by the general formula (I):

$$CF_2=CF-ORf \qquad (I)$$

wherein Rf represents a perfluoro aliphatic hydrocarbon group. In this specification, the term "perfluoro aliphatic hydrocarbon group" means a group resulting from substitution of fluorine atoms for all the carbon atom-bound hydrogen atoms. The perfluoro aliphatic hydrocarbon group may contain at least one ether oxygen atom.

The above perfluorovinylether is, for example, a perfluoro (alkylvinylether) [PFAVE] in which Rf in the above general formula (I) is a perfluoroalkyl group containing 1 to 10 carbon atoms, preferably 1 to 6 carbon atoms.

The perfluoroalkyl group in the above PFAVE includes, among others, perfluoromethyl, perfluoroethyl, perfluoropropyl, perfluorobutyl, perfluoropentyl, perfluorohexyl and the like groups. In view of the creep resistance and monomer cost, perfluoropropyl is preferred.

The perfluorovinylether may also be a perfluoro(alkoxyalkylvinylether) in which Rf in the above general formula (I) is a perfluoro(alkoxyalkyl) group. In this case, the perfluoroalkoxyl group in the above Rf may have a straight or branched linear carbon chain or a cyclic ether structure containing 1 to 3 oxygen atoms. Such Rf is not particularly restricted but includes, among others, perfluoro(alkoxyalkyl) groups containing 4 to 9 carbon atoms, such as perfluoro(2-methoxypropyl) and perfluoro(2-propoxypropyl); organic groups represented by the general formula:

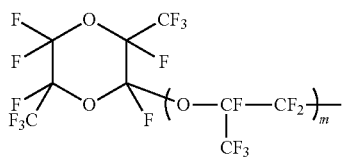

wherein m represents an integer of 0 (zero) or 1 to 4; and organic groups represented by the general formula:

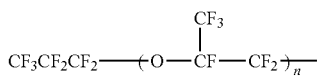

wherein n represents an integer of 1 to 4.

In the above-mentioned modified PTFE, the mole ratio of tetrafluoroethylene and the other comonomer(s) may vary depending on the copolymer. Preferably, however, the tetrafluoroethylene:other comonomer mole ratio is 99:2 to 99.999:0.001, more preferably 99:1 to 99.999:0.001. When the other comonomer content is lower than 0.001 mole percent, the creep resistance (total deformation) may decrease in some instances and, when it exceeds 1 mole percent, the tensile strength, for instance, tends to decrease and, in cases where an expensive perfluorovinylether is used, the creep resistance will be no more improved in proportion to the content thereof; this may present an economical disadvantage in some instances. More preferably, the above ratio is 99.97:0.03 to 99.8:0.2. As for the other comonomer content, the lower limit thereto is more preferably 0.03 mole %, and the upper limit is more preferably 1 mole %, still more preferably 0.2 mole %, relative to the total number of moles of tetrafluoroethylene and the other comonomer(s).

As the modified PTFE mentioned above, may be used one single species or two or more species differing in average molecular weight and/or copolymerization composition, for instance. As the above-mentioned not-modified PTFE, also may be used one single species or two or more species differing in average molecular weight, for instance.

The PTFE-based polymer in the PTFE powder of the present invention can be obtained by any of the methods of polymerization known in the art, such as suspension polymerization, emulsion polymerization, bulk polymerization, and solution polymerization. In view of the industrial versatility, suspension or emulsion polymerization is preferably employed, and suspension polymerization is more preferred.

The conditions in carrying out the various methods of polymerization mentioned above are not particularly restricted but, in the case of suspension polymerization, for instance, the method described in WO 93/16126, for instance, is preferably employed and carried out as follows.

Thus, the polymerization is preferably carried out at 40 to 55° C. using, as the initiator, a persulfate salt having a half-life of 18 to 120 hours at 55° C. The amount of the initiator to be charged is preferably such that the decomposition in 3 hours after initiation of the polymerization amounts to a concentration $4 \times 10^{-7}$ to $8 \times 10^{-6}$ moles/liter relative to the water for polymerization. When the half-life or decomposition rate is within the above range, PTFE-based polymers with a high molecular weight are obtained; for example, good tensile strength, for instance, can be readily obtained; and the rate of polymerization becomes favorable for industrial scale production. The persulfate salt includes ammonium persulfate and potassium persulfate, among others.

In carrying out the above polymerization, an emulsifier incapable of acting as a telogen, for example a perfluorocarboxylic acid salt such as ammonium perfluorooctanoate or ammonium perfluorononanoate, may optionally be added in an amount of 1 to 200 ppm relative to the water for polymerization. The addition of a small amount of such an emulsifier results in an increased specific surface area of the resulting PTFE powder.

The polymerization time is generally about 8 to 25 hours.

The PTFE powder of the present invention may be the virgin polymer of the above PTFE-based polymer just obtained by polymerization, or a polymer resulting from rough grinding, washing, drying, pulverizing and/or granulating treatments of the virgin polymer just obtained by polymerization, provided that it has such physical characteristics of moldings or such moldings and powder characteristics as mentioned above.

The methods of the above rough grinding, washing and drying each is not particularly restricted but may be any of the methods known in the art. For example, when the above PTFE-based polymer is produced by suspension polymerization, the virgin polymer just obtained by polymerization generally has an average particle diameter of about several millimeters and, therefore, it is roughly ground in an aqueous medium, then washed in a washing vessel, and dried. In this specification, the above rough grinding indicates a step to be carried out separately from the above-mentioned pulverization step. The average particle diameter generally attained by rough grinding exceeds about 100 μm, and the rough grinding is distinguishable from the pulverization in that it mainly gives particles with such a relatively large average particle diameter as mentioned above.

The pulverization mentioned above is generally carried out after subjecting the virgin polymer of a PTFE-based polymer just obtained by polymerization to rough grinding, washing and/or drying according to need. In this specification, the virgin polymer of a PTFE-based polymer just obtained by polymerization and subjected to rough grinding, washing and/or drying according to need but not yet subjected to the above-mentioned pulverization or granulation, or heating to a temperature at or above the melting point of the PTFE-based polymer is sometimes referred to also as "unpulverized PTFE powder".

When subjected to the above-mentioned pulverization, the PTFE powder of the present invention can become, for example, a molding powder derived from the virgin polymer just obtained by polymerization of the PTFE-based polymer and rendered much more uniform in particle diameter, with the result that the step of removing those particles whose diameter is out of a desired range becomes unnecessary and the physical characteristics of moldings and powder characteristics can be improved.

The average diameter of the particles to be obtained by the above pulverization is not particularly restricted but, in view of the possibility of obtaining moldings which are compact and excellent in molding characteristics and, further, in view of the possibility that better powder characteristics can be obtained in some instances, it is preferably not greater than 100 μm, for instance. More preferably, the lower limit is 3 μm, and the upper limit is 60 μm. Thus, the range of 3 to 60 μm is more preferred. The average particle diameter can be adequately selected within the above range according to the desired physical characteristics of moldings and so forth.

In this specification, the average particle diameter after the above pulverization is the value obtained in accordance with the following dry laser method.

Thus, the test powder is measured for particle diameter using the HELOS & RODOS System (trademark, product of SYMPATEC), and the value corresponding to the cumulative weight percentage of 50 is employed as:

Test powder average particle diameter $d_{50}$=X μm.

The method of measurement comprises placing 15 to 30 g of the test powder on the hopper of the system mentioned above and feeding the test powder to a distributor by means of a vibrator belonging to the hopper. The distributor then sucks in the test powder at −150 mbar, and the test powder sucked in is dispersed by compressed air at a dispersion pressure of 1 bar. The test powder dispersed is conveyed to a measuring sensor section, which senses the shadows of the test powder as projected by laser beams, whereupon the above system calculates the particle size distribution of the test powder and indicates the value of the average particle diameter $d_{50}$.

The method for the above-mentioned pulverization is not particularly restricted but may comprise, for example, using such a pulverizer as a hammer mill, a pulverizer having a blade-equipped rotor, an air jet energy type pulverizer, or an impact pulverizer, in the presence of water or in a dry condition. Preferably, the pulverization is carried out in such a manner that it will not cause substantial fibril-formation of the particles obtained by pulverization.

If the above pulverization does not cause the PTFE powder obtained to undergo "substantial fibril-formation", a slight extent of fibril-formation is allowable.

That no substantial fibril-formation occurs with the particles obtained by the above pulverization can also be demonstrated, for example, by electron photomicrographic observation of the particles obtained, which indicates no substantial protrusion of fiber-like pieces on the particle surface and the smoothly curved surface of the particles.

In this specification, such a method of pulverization by which the fibril-formation of the particles can be substantially prevented is referred to as "fibril-formation-free method of pulverization".

When the above-mentioned fibril-formation-free method of pulverization is used as the method of pulverization, the intended pulverization can be carried out without any fibril-formation or with little fibril-formation. Therefore, when the PTFE powder obtained is subjected to molding, it shows good pressure-transmitting properties upon pressure application in the step of preforming and can give compact moldings having good physical properties in moldings. The PTFE powder of the present invention obtained can be excellent in powder characteristics, where desired.

Preferred as the above fibril-formation-free method of pulverization is, for example, a method by which the shearing force to be applied during pulverization can be reduced as far as possible. Such fibril-formation-free method of pulverization is not particularly restricted but includes, among others, the air jet pulverization method, freeze pulverization method, freeze air jet pulverization method, and water jet pulverization method. Such pulverization methods may be employed singly or two or more of them may be used in combination.

The above-mentioned air jet pulverization method, freeze pulverization method, freeze air jet pulverization method, and water jet pulverization method are the same as those mentioned later herein referring to the method of producing PTFE molding powders.

Preferred as the method of pulverization are the freeze pulverization method, freeze air jet pulverization method and air jet pulverization method. The freeze air jet pulverization method is more preferred.

The granulation mentioned above is generally carried out after subjecting the virgin polymer just obtained by polymerization of the PTFE-based polymer to the above pulverization. When subjected to the granulation, the PTFE powder of the present invention can acquire improved powder characteristics, without significant impairment in physical characteristics of moldings.

Therefore, as to whether the PTFE powder of the present invention is to be subjected to the above granulation or not, selection can be made according to the intended use thereof and, thus, the range of choice as a molding powder can be enlarged. Whether the granulation is carried out or not, the PTFE powder of the present invention can be excellent in physical characteristics of moldings or in physical characteristics of moldings and powder characteristics, as described above.

When importance is given to physical characteristics of moldings in the intended field of utilization, for instance, the PTFE powder of the present invention may not be subjected to granulation after the above pulverization and, when importance is given to powder characteristics or to powder characteristics and physical characteristics of moldings in the intended field of application, the PTFE powder of the present invention may be subjected to the above granulation following the above pulverization.

The average particle diameter of the grains obtained by the above granulation is not particularly restricted but may vary according to the particle diameter of the powder to be granulated, the granulation conditions and other factors. From the viewpoint that the powder characteristics can be improved without significantly impairing the physical characteristics of moldings, it may be 30 to 800 μm, for instance, and the upper limit is preferably 700 μm, hence a preferred range is 30 to 700 μm. It can be properly selected within the above range according to the desired physical characteristics of moldings and/or powder characteristics.

In this specification, the average particle diameter after the above granulation is the value obtained by that method of measuring the average particle diameter of a granular powder which is described in WO 98/41569. Thus, 10-, 20-, 32-, 48-, 60- and 80-mesh (inch mesh) standard sieves are piled up in that order from the top, the PTFE powder is placed on the 10-mesh sieve, and finer grains of the PTFE powder are allowed to fall successively onto the lower sieves by vibrating the sieves. The percentage proportions of the PTFE powder fractions retained on the respective sieves are determined, and the cumulative percentage (ordinate) of retained fractions is plotted against the sieve opening (abscissa) of each sieve on a logarithmic probability paper, a straight line is drawn along the resulting plots, and the particle diameter corresponding to the 50% cumulative percentage is determined on that straight line and this value is recorded as the average particle diameter.

The method for the above granulation is not particularly restricted but an underwater granulation method is preferred. The underwater granulation method is not particularly restricted but the conventional methods, for instance, may be used. Preferred is, however, the method comprising granulating by stirring in water in the presence of an organic liquid capable of liquid-liquid interface formation with water, together with a nonionic and/or anionic surfactant. Such method of granulation is described in Japanese Kokai Publication Hei-10-259252 and Japanese Kokai Publication Hei-10-316763 and is referred to herein as "emulsification/dispersion granulation method".

It is considered that when the above emulsification/dispersion granulation method is employed as the method of granulation, the organic liquid forms small spherical droplets in the step of granulation, hence the granule of the PTFE-based polymer granulated in these droplets become small in particle diameter and spherical in shape, with the result that the apparent density and powder flowability can both be improved.

The organic liquid to be used for liquid-liquid interface formation with water in the above emulsification/dispersion granulation method includes, among others, alcohols such as 1-butanol; ethers such as diethyl ether; ketones such as methyl ethyl ketone; aliphatic hydrocarbons such as pentane; aromatic hydrocarbons such as benzene; and halogenated hydrocarbons such as dichloromethane, 1,1,1-trichloroethane, 1,1-dichloro-2,2,3,3,3-pentafluoropropane, 1,3-dichloro-1,1,2,2,3-pentafluoropropane, 1,1-dichloro-2,2,2-trifluoroethane and 1,1-dichloro-1-fluoroethane. In view of their being nonflammable and satisfying the chlorofluorocarbon control requirements, among others, halogenated hydrocarbons are preferred, and chlorohydrocarbons and chlorofluorohydrocarbons are more preferred.

The organic liquid capable of liquid-liquid interface formation with water is preferably added at addition levels of 30 to 90% by weight relative to the PTFE-based polymer powder to be granulated. A more preferred lower limit is 50% by weight, and a more preferred upper limit is 80% by weight, hence addition levels of 50 to 80% by weight are more preferred.

The nonionic surfactant to be used in the above emulsification/dispersion granulation method includes, for example, amine oxides, polyoxyethylenealkylphenylethers, and segmented polyalkylene glycols comprising a hydrophobic segment of a poly(oxy-$C_{3-4}$-alkylene) unit and a hydrophilic segment of a poly(oxyethylene) unit.

The anionic surfactant to be used in the above emulsification/dispersion granulation method includes, for example, higher alcohol sulfate ester salts such as sodium lauryl sulfate; and a fluorine-containing-carboxylic-acid based or fluorine-containing-sulfonic-acid-based anionic surfactants having a fluoroalkyl or chlorofluoroalkyl group(s).

In the above emulsification/dispersion granulation method, one single species or a combination of two or more species may be used as the organic liquid and the nonionic and/or anionic surfactant each.

In or after the step of pulverization and/or after the step of granulation, classification may be carried out, if necessary. The method of classification is not particularly restricted but, for example, any of the methods known in the art can be used. When the classification is carried out after the granulation, for instance, the PTFE powder in granulated form with a relatively small average particle diameter can be obtained depending on the classification conditions and, although the powder characteristics generally get worse to some extent, the physical characteristics of moldings can be improved and, in particular, the surface roughness Ra can be reduced to 40%, for instance, and the tensile elongation can be improved to 110 to 130%, for instance, as compared with the values before classification.

The PTFE powder of the present invention may contain one or more fillers, such as reinforcing agents; additives and so forth each in an appropriate amount, according to need.

In cases where the PTFE powder contains a filler, an additive and/or the like, it is generally preferred, from the viewpoint of uniform dispersion in the resulting PTFE powder, that the filler, additive and so forth be incorporated after the pulverization or in the step of granulation.

The additive is not particularly restricted but may be any of those generally used in PTFE-based polymer molding powders. For example, there may be mentioned catalysts, carriers, and colorants, among others.

The filler is not particularly restricted but includes glass fibers, graphite powders, bronze powders, gold powders, silver powders, copper powders, stainless steel powders, stainless steel fibers, nickel powders, nickel fibers and like metal fibers and metal powders; molybdenum disulfide powders, fluorinated mica powders, coke powders, carbon fibers, boron nitride powders, carbon black and like inorganic fibers and inorganic powders; aromatic heat-resistant resin powders such as polyoxybenzoyl polyester; polyimide powders, tetrafluoroethylene/perfluoro(alkylvinylether) copolymer [PFA] powders, polyphenylene sulfide powders and like organic powders.

The PTFE powder of the present invention is not particularly restricted but may be any one having the above-defined physical characteristics of moldings or the above-defined physical characteristics of moldings and powder characteristics. When the above-mentioned granulation is not carried out, it is preferred that the PTFE-based polymer be the above-mentioned not-modified PTFE and that the unpulverized PTFE powder of the PTFE-based polymer having an amorphous index (AI) of not less than 0.25 be subjected to the above-mentioned pulverization. In this specification, the PTFE powder of the present invention as obtained by subjecting to the above-mentioned pulverization the unpulverized PTFE powder in which the PTFE-based polymer is the above-mentioned not-modified PTFE having an AI within the above range is referred to as "PTFE powder (I)".

The AI is the ratio ($A_{778}/A_{2367}$) between the absorbance at 778 cm$^{-1}$ ($A_{778}$) and the absorbance at 2367 cm$^{-1}$ ($A_{2367}$) in infrared spectrophotometry. The absorbance at 2367 cm$^{-1}$ corresponds to an overtone of the $CF_2$ stretching vibration and changes in proportion to the film thickness of the measurement target. The AI serves as an index of crystallinity through an absorbance per unit thickness-versus-X ray diffraction working curve. A higher AI value indicates a lower crystallinity.

The above PTFE powder (I) is a product resulting from subjecting the unpulverized PTFE powder to the above-mentioned pulverization, which comprises a PTFE-based polymer having such a very low crystallinity, and therefore, it is supposed that moldings lower in surface roughness Ra and higher in tensile strength and tensile elongation as compared with the prior art ones and, further, high in dielectric breakdown voltage can be obtained with ease owing to compressing pressures in the step of molding. While the AI may be 0.25 to 0.4, a preferred lower limit is 0.3, hence it is preferably 0.3 to 0.4.

An AI within the above range can be obtained, for example, by relatively lowering the temperature for the polymerization of the PTFE-based polymer. When the polymerization temperature of the PTFE-based polymer is 1 to 40° C., for instance, it is possible to obtain, with ease, an unpulverized PTFE powder having an AI value within the above range. A preferred lower limit to the polymerization temperature of the PTFE-based polymer is 3° C. and a preferred upper limit is 25° C.

In this specification, the AI is the value obtained by the method of measurement according to JIS K 0117.

The PTFE powder (I) comprises the above-mentioned not-modified PTFE. Unlike a modified PTFE, a not-modified PTFE generally has a tendency to be high in crystallinity and low in AI. It is supposed, however, that the PTFE powder (I) of the present invention, in spite of its being not-modified PTFE, has such a high AI as mentioned above, hence it can give moldings excellent in physical characteristics in molding, as described above.

The average particle diameter of the above PTFE powder (I) is not particularly restricted but may be not greater than 60 μm, for instance. When it is within the above range, moldings excellent in surface smoothness, tensile strength, tensile elongation and/or high voltage insulation properties can be obtained with ease. A preferred lower limit is 1 μm, hence it is preferably 1 to 60 μm.

In view of the possibility of obtaining moldings excellent in surface smoothness, in particular, the average particle diameter of the above PTFE powder (I) is preferably not greater than 25 μm. When it is within the above range, the surface roughness Ra can be reduced as compared with the values attainable in the prior art. Such average particle diameter may be, for example, 3 to 25 μm.

In view of the possibility of obtaining moldings excellent in tensile strength, in particular, the average particle diameter of the above PTFE powder (I) is preferably 20 to 60 μm. When it is within the above range, the tensile strength can be increased as compared with the levels attainable in the prior art. A preferred lower limit is 40 μm, a more preferred lower limit is 45 μm, a preferred upper limit is 60 μm, and a more preferred upper limit is 55 μm. Thus, the average particle diameter of the PTFE powder (I) is preferably 40 to 60 μm, more preferably 45 to 55 μm.

In view of the possibility of obtaining moldings excellent in tensile elongation, in particular, the average particle diameter of the PTFE powder (I) is preferably not greater than 6 μm. When it is within the above range, the tensile elongation can be increased as compared with the values obtainable in the prior art. While such average particle diameter may be, for example, 1 to 6 μm, a preferred lower limit is 3 μm, hence it is more preferably 3 to 6 μm.

Thus, from the good tensile strength viewpoint, in particular, the average particle diameter of the PTFE powder (I) is more preferably 20 to 60 μm. From the viewpoint of the superiority in surface roughness Ra and tensile elongation, the average particle diameter of the PTFE powder (I) is preferably not greater than 6 μm, a more preferred lower limit thereto is 1 μm, a still more preferred lower limit is 3 μm and, thus, it is more preferably 1 to 6 μm, still more preferably 3 to 6 μm. For the above-mentioned physical characteristics of moldings to be generally good, the average particle diameter of the PTFE powder (I) is more preferably 20 to 60 μm.

When the above-mentioned granulation is not carried out, a PTFE powder obtained by subjecting to the above-mentioned pulverization the above-mentioned unpulverized PTFE powder in which the PTFE-based polymer is the above-mentioned modified PTFE and has a heat of crystallization of 18 to 25 J/g is also preferred as the PTFE powder of the present invention. In this specification, the PTFE powder of the present invention as obtained by subjecting to the above-mentioned pulverization the unpulverized PTFE powder in which the PTFE-based polymer is the above-mentioned modified PTFE having a heat of crystallization within the above range is referred to as "PTFE powder (II)".

Preferred as the modified PTFE in the above PTFE powder (II) is a copolymer obtained by carrying out copolymerization by using TFE and a PFAVE as monomeric components. Preferred as the PFAVE is perfluoro(propylvinylether). The proportion of the PFAVE in all the monomeric components is preferably 0.03 to 0.2% by weight.

The above-mentioned heat of crystallization serves as an index of the molecular weight of the PTFE-based polymer. A higher heat of crystallization tends to result in a higher molecular weight. A more preferred upper limit thereto is 23.5 J/g, hence it is more preferably 18 to 23.5 J/g.

A heat of crystallization within the above range can be obtained, for example, by selecting an initiator having a half-life or decomposition rate within the range mentioned above or adjusting the polymerization temperature and/or time in the PTFE-based polymer polymerization reaction.

Since the above PTFE powder (II) is obtained by subjecting the unpulverized PTFE powder to the above-mentioned pulverization which powder comprises such relatively high-molecular-weight modified PTFE, it is considered that the PTFE-based polymer have both mechanical strength characteristics and flexibility and, therefore, the PTFE powder (II) can easily give moldings higher in tensile strength and tensile elongation as compared with the conventional moldings and high in dielectric breakdown voltage.

In this specification, the heat of crystallization is the value obtained by accurately weighing about 3 mg of the unsintered PTFE powder, placing the same in an aluminum pan for exclusive use, and carrying out the relevant measurement using a differential scanning calorimeter (DSC; trademark: DSC-50, product of Shimadzu Corporation). In carrying out the measurement, the aluminum pan is first heated to 250° C. in a nitrogen atmosphere, once maintained at that temperature, further heated to 380° C. at a rate of 10° C./minute to fully melt the crystals, then lowering the temperature from 380° C. to 250° C. at a rate of 10° C./minute, and measuring the heat of crystallization at the crystallization point. The crystallization heat value is determined by drawing, on the DSC chart obtained, a tangent line at and from the point of 275° C. to the other end of the peak, as shown in FIG. 2, and determining the area enclosed by the peak curve and tangent line. FIG. 2 shows the case of Example 8 as an example.

The average particle diameter of the above PTFE powder (II) is not particularly restricted but may be, for example, not greater than 60 μm, generally 1 to 25 μm. When it is within the above range, moldings excellent in tensile strength, tensile elongation and/or high-voltage insulation properties can be obtained with ease.

In view of the possibility of obtaining moldings excellent in tensile strength, in particular, the average particle diameter of the above PTFE powder (II) is preferably not greater than 13 μm. When it is within the above range, the tensile strength can be increased as compared with the levels attainable in the prior art. Such average particle diameter may be 1 to 13 μm, for instance.

In view of the possibility of obtaining moldings excellent in tensile elongation, in particular, the average particle diameter of the PTFE powder (II) is preferably not greater than 6 μm. When it is within the above range, the tensile elongation can be increased as compared with the values obtainable in the prior art. Such average particle diameter may be, for example, 1 to 6 μm.

When the above-mentioned granulation is carried out, also preferred as the PTFE powder of the present invention is a PTFE powder in which the PTFE-based polymer is the above-mentioned modified PTFE and which has an average particle diameter of not greater than 100 μm as a result of the above-mentioned pulverization. In this specification, the PTFE powder of the present invention in which the PTFE-based polymer is the above-mentioned modified PTFE and which has an average particle diameter within the above range as a result of the above-mentioned pulverization without carrying out the above-mentioned granulation and which is other than the PTFE powder (II) mentioned above is referred to as "PTFE powder (III)".

The above PTFE powder (III) can easily give moldings superior in surface roughness Ra and tensile elongation to the conventional ones and high in dielectric breakdown voltage presumably because it is prepared from the above-mentioned modified PTFE and has a small average particle diameter within the above range, as mentioned above, and preferably comprises substantially fibril-free particles, and can give flexible and compact moldings.

The average particle diameter of the above PTFE powder (III) is not particularly restricted but may be, for example, 1 to 25 μm. When it is within the above range, moldings excellent in surface smoothness, tensile elongation and/or high-voltage insulation properties can be obtained with ease.

In view of the possibility of obtaining moldings excellent in surface smoothness, in particular, the average particle diameter of the above PTFE powder (III) is preferably 1 to 13 μm. When it is within the above range, the surface roughness Ra can be reduced as compared with the values attainable in the prior art. A preferred lower limit thereto is 6 μm, and a preferred upper limit is 10 μm, hence it is preferably 6 to 10 μm.

In view of the possibility of obtaining moldings excellent in tensile strength, in particular, the average particle diameter of the above PTFE powder (III) is preferably 1 to 13 μm. When it is within the above range, the tensile strength can be increased as compared with the levels attainable in the prior art. A preferred lower limit is 6 μm, and a preferred upper limit is 10 μm, hence it is preferably 6 to 10 μm.

In cases where the PTFE powder of the present invention is one that has experienced the above-mentioned granulation, the one derived, by granulation, from the above-mentioned PTFE powder (I), PTFE powder (II) and/or PTFE powder (III) is preferred from the viewpoint that good physical characteristics of moldings can be retained as far as possible.

In this specification, the PTFE powder of the present invention that has undergone the above-mentioned granulation is referred to as "PTFE powder (I')" when the PTFE powder (I) was subjected to the above-mentioned granulation, as "PTFE powder (II')" when the PTFE powder (II) was subjected to the above-mentioned granulation, or as "PTFE powder (III')" the PTFE powder (III) was subjected to the above-mentioned granulation.

The above PTFE powder (I'), PTFE powder (II') and PTFE powder (III'), which are derived, by granulation, from the respective PTFE powders excellent in physical characteristics of moldings, as mentioned above, can have improved powder characteristics, without the physical characteristics of moldings being significantly sacrificed.

The average particle diameter of the above PTFE powder (I'), PTFE powder (II') or PTFE powder (III') is not particularly restricted but may be 30 to 800 μm, for instance. A preferred upper limit is, however, 700 μm. Thus, it is preferably 30 to 700 μm.

The average particle diameter of the PTFE powder, which is to be granulated to give such granulated PTFE powder of the present invention is not particularly restricted but, from the viewpoint that good physical characteristics of moldings and powder characteristics can be obtained with ease, it is preferably 1 to 25 μm.

As mentioned above, the PTFE powder of the present invention can have good physical characteristics of moldings and can improve, in particular, the surface roughness Ra tensile strength or tensile elongation as compared with the conventional powder solids comprising a PTFE-based polymer. The PTFE powder of the present invention can have not only good physical characteristics of moldings but also good powder characteristics where desired.

The mechanisms of the PTFE powder of the present invention producing such advantageous effects are not clear but supposed to be as follows.

Thus, the PTFE powder of the present invention is not particularly restricted but may be any powder solid having such physical characteristics of moldings or such molding characteristics and powder characteristics as mentioned above. When the above-described granulation is not carried out, the physical characteristics of moldings are excellent and, in particular, in the case of the above-mentioned PTFE powder (I), PTFE powder (II) or PTFE powder (III), very good physical characteristics of moldings can be obtained.

Therefore, the excellent characteristics of the PTFE powder of the present invention are presumably due to the fact that the above-mentioned unpulverized PTFE powder of a not-modified PTFE having an AI of not less than 0.25 or a modified PTFE with a heat of crystallization of 18 to 25 J/g has been subjected to the above-described pulverization, as described hereinabove or to the fact that the above powder comprises a modified PTFE and has been pulverized to an average particle diameter of not greater than 100 μm. In particular when the pulverization is carried out by the above-described fibril-formation-free method of pulverization, substantial fibril-formation hardly occurs and it is easy to improve the physical characteristics of moldings.

When the PTFE powder of the present invention is prepared by the above-described granulation, the powder characteristics thereof can also be improved, as described hereinabove. When prepared by the above granulation, the PTFE powder (I), PTFE powder (II) or PTFE powder (III) can have both good powder characteristics and good physical characteristics of moldings.

The PTFE powder of the present invention has the following specific characteristics.

(1) The PTFE powder of the present invention is characterized in that a surface roughness Ra of molded articles a1 for measurement is less than 0.92 μm. In this specification, the PTFE powder of the present invention which has such a feature is referred to as "PTFE powder (1)". When the surface roughness Ra is within the above range, moldings excellent in surface smoothness can be obtained. Such a surface roughness Ra within the above range has never been obtained with the conventional PTFE powders.

Preferred as the above PTFE powder (1) are the above-described PTFE powder (I), PTFE powder (III) and PTFE powder (I'). More preferred are the PTFE powder (I) with an average particle diameter of 1 to 25 μm, the PTFE powder (III) with an average particle diameter of 1 to 13 μm, and the PTFE powder (I') with an average particle diameter of to 250 μm.

As regards the PTFE powder (1), a surface roughness of molded articles a1 for measurement is preferably less than 0.8 μm. Preferred as such PTFE powder (1) are the PTFE powder (I) with an average particle diameter of 1 to μm, and the PTFE powder (I') with an average particle diameter of 20 to 60 μm.

The PTFE powder (1) can be properly used without being particularly restricted, for example, for producing the moldings required to show low levels of surface roughness, such as ball valve seats, uncut seal rings, large-sized sheets for use as rectangular containers for semiconductors, etc.

(2) The PTFE powder of the present invention is characterized in that an apparent density is not lower than 0.45 g/cm$^3$ and a surface roughness Ra of molded articles a1 for measurement is less than 1.9 μm. In this specification, the PTFE powder of the present invention which has such features is referred to as "PTFE powder (2)". When the apparent density and surface roughness Ra are within the above respective ranges, the molds can be made smaller, bridging in the hopper and like troubles can be prevented and, in addition, moldings excellent in surface smoothness can be obtained.

Preferred as the above-mentioned PTFE powder (2) is the above-mentioned PTFE powder (I').

While the prior art PTFE powders show a correlation such that the surface roughness Ra increases as the apparent density increases and, thus, when the apparent density is within the above range, the surface roughness Ra amounts to at least 1.9 μm, the concept of such correlation does not apply to the PTFE powder (2) at all.

Preferably, in the above PTFE powder (2), an apparent density is not lower than 0.6 g/cm$^3$ and a surface roughness Ra of molded articles a1 for measurement is less than 1.6 μm.

More preferably, in the above PTFE powder (2), an apparent density is not lower than 0.7 g/cm$^3$ and a surface roughness Ra of molded articles a1 for measurement is less than 1.2 μm. Preferred as such PTFE powder (2) is the above-defined PTFE powder (I') with an average particle diameter of 80 to 140 μm.

The PTFE powder (2) can be used without being particularly restricted, for example, for producing the moldings required to show low levels of surface roughness and high levels of apparent density for productivity enhancement, for example in the production of moldings for use in the semiconductor field, large-sized sheets for use as rectangular containers, sliding pats and so forth, etc.

(3) The PTFE powder of the present invention is characterized in that a flowability is not less than 0.5 times and a surface roughness Ra of molded articles a1 for measurement is less than 1.9 μm. In this specification, the PTFE powder of the present invention which has such features is referred to as "PTFE powder (3)".

When the flowability and surface roughness Ra are within the above respective ranges, the powder flowability is good, bridging in the hopper can be prevented and, in addition, moldings excellent in surface smoothness can be obtained. Further, the PTFE powder (3) can provide good physical characteristics of moldings even when the pressure in the step of compression molding is reduced, so that it can be appropriately used in the production of the so-called large-sized moldings.

Preferably, a flowability of the above PTFE powder (3) is not less than 0.5 times and a surface roughness Ra of molded articles a1 for measurement is less than 1.6 μm.

More preferably, in the above PTFE powder (3), a flowability is not less than 0.5 times and a surface roughness Ra of molded articles a1 for measurement is less than 1.2 μm, or a flowability is not less than 4 times and a surface roughness Ra of molded articles a1 for measurement is less than 1.6 μm. Desirable is the latter case.

Still more preferably, in the PTFE powder (3), a flowability is not less than 4 times and a surface roughness Ra of molded articles a1 for measurement is less than 1.2 μm.

Preferred as the PTFE powder (3) is the above-mentioned PTFE powder (I').

The PTFE powder (3) can be properly used without being particularly restricted, for example, for producing the moldings required to show low levels of surface roughness and high levels of powder flowability for productivity enhancement, for example in molding large-sized sheets for use as rectangular containers for semiconductors, etc.

(4) The PTFE powder of the present invention is characterized in that a flowability is not less than 0.5 times and an apparent density is not lower than 0.45 g/cm$^3$ and a surface roughness Ra of molded articles a1 for measurement is less than 1.9 μm. In this specification, the PTFE powder of the present invention which has such features is referred to as "PTFE powder (4)". When the flowability, apparent density and surface roughness Ra are within the above respective ranges, the powder flowability becomes good, it becomes possible to prevent bridging in the hopper and reduce the sizes of molds and so forth and, in addition, moldings excellent in surface smoothness can be obtained.

Preferably, in the above PTFE powder (4), a flowability is not less than 0.5 times, an apparent density is not lower than 0.6 g/cm$^3$ and a surface roughness Ra of molded articles a1 for measurement is less than 1.6 μm, or a flowability is not less than 4 times, an apparent density is not lower than 0.6 g/cm$^3$ and a surface roughness Ra of molded articles a1 for measurement is less than 1.9 μm. Desirable is the latter case.

More preferably, in the above PTFE powder (4), a flowability is not less than 0.5 times, an apparent density is not lower than 0.6 g/cm$^3$ and a surface roughness Ra of molded articles a1 for measurement is less than 1.2 μm, or a flowability is not less than 4 times, an apparent density is not lower than 0.8 g/cm$^3$ and a surface roughness Ra of molded articles a1 for measurement is less than 1.6 μm. Desirable is the latter case.

Preferred as the PTFE powder (4) is the above-mentioned PTFE powder (I').

The PTFE powder (4) can be properly used without being particularly restricted, for example, for producing the moldings required to show low levels of surface roughness, high levels of powder flowability and high levels of apparent density for productivity enhancement, for example in molding large-sized sheets for use as rectangular containers for semiconductors, and so forth.

(5) The PTFE powder of the present invention is characterized in that an apparent density is not lower than 0.45 g/cm$^3$ and a dielectric breakdown voltage of molded articles a2 for measurement is not lower than 9.1 kV. In this specification, the PTFE powder of the present invention which has such features is referred to as "PTFE powder (5)". When the apparent density and dielectric breakdown voltage are within the above respective ranges, it becomes possible to prevent bridging in the hopper and reduce the sizes of molds and so forth and, in addition, moldings excellent in dielectric breakdown strength can be obtained.

While the prior art PTFE powders show a correlation such that the dielectric breakdown voltage decreases as the apparent density increases and, thus, when the apparent density is within the above range, the dielectric breakdown voltage is lower than 9.1 kV, the concept of such correlation does not apply to the PTFE powder (5) at all.

Preferably, in the above PTFE powder (5), an apparent density is not lower than 0.45 g/cm$^3$ and a dielectric breakdown voltage of molded articles a2 for measurement is not lower than 12 kV, or an apparent density is not lower than 0.5 g/cm$^3$ and a dielectric breakdown voltage of molded articles a2 for measurement is not lower than 9.1 kV. Desirable is the latter case.

More preferably, in the above PTFE powder (5), an apparent density is not lower than 0.6 g/cm$^3$ and a dielectric breakdown voltage of molded articles a2 for measurement is not lower than 12 kV.

Preferred as the PTFE powder (5) are the above-mentioned PTFE powder (I'), PTFE powder (II') and PTFE powder (III').

The PTFE powder (5) can be properly used without being particularly restricted, for example, for producing the moldings required to high levels of dielectric breakdown voltage and high levels of apparent density for productivity enhancement, for example in molding insulating tapes, insulated nozzles and so forth.

(6) The PTFE powder of the present invention is characterized in that a flowability is not less than 0.5 times and a dielectric breakdown voltage of molded articles a2 for measurement is not lower than 9.1 kV. In this specification, the PTFE powder of the present invention which has such features is referred to as "PTFE powder (6)". When the flowability and dielectric breakdown voltage are within the above respective ranges, the powder flowability becomes good, it becomes possible to prevent bridging in the hopper and, in addition, moldings excellent in dielectric breakdown voltage can be obtained.

While the prior art PTFE powders show a correlation such that the dielectric breakdown voltage decreases as the flowability increases and, thus, when the flowability is within the above range, the dielectric breakdown voltage is lower than 9.1 kV, the concept of such correlation does not apply to the PTFE powder (6) at all.

Preferably, is the above PTFE powder (6), a flowability is not less than 0.5 times and a dielectric breakdown voltage of molded articles a2 for measurement is not lower than 10 kV, or a flowability is not less than 4 times and a dielectric breakdown voltage of molded articles a2 for measurement is not lower than 9.1 kV. Desirable is the latter case.

More preferably, in the above PTFE powder (6), a flowability is not less than 0.5 times and a dielectric breakdown voltage of molded articles a2 for measurement is not lower than 12 kV, or a flowability is not less than 4 times and a dielectric breakdown voltage of molded articles a2 for measurement is not lower than 10 kV. The latter one is particularly preferred as the PTFE powder (6).

Preferred as the PTFE powder (6) are the above-mentioned PTFE powder (I'), PTFE powder (II') and PTFE powder (III'). The above-mentioned PTFE powder (I') is preferably one derived from the PTFE powder (I) with an average particle diameter of 1 to 13 μm by the above-described granulation.

The PTFE powder (6) can be properly used without being particularly restricted, for example, for producing the moldings required to show high levels of dielectric breakdown voltage and high levels of powder flowability for productivity enhancement, for example in molding insulating tapes, insulated nozzles and so forth.

(7) The PTFE powder of the present invention is characterized in that a flowability is not less than 0.5 times and an apparent density is not less than 0.45 g/cm$^3$ and a dielectric breakdown voltage of molded articles a2 for measurement is not lower than 9.1 kV. In this specification, the PTFE powder of the present invention which has such features is referred to as "PTFE powder (7)". When the flowability, apparent density and dielectric breakdown voltage are within the above respective ranges, it becomes possible to prevent bridging in the hopper and/or reduce the sizes of molds and so forth and, in addition, moldings excellent in dielectric breakdown voltage can be obtained.

While the prior art PTFE powders show a correlation such that the dielectric breakdown voltage decreases as the flowability or apparent density increases as described above referring to the PTFE powder (5) and PTFE powder (6), the concept of such correlation does not apply to the PTFE powder (7) at all.

Preferably, in the above PTFE powder (7), a flowability is not less than 0.5 times, an apparent density is not lower than 0.45 g/cm$^3$ and a dielectric breakdown voltage of molded articles a2 for measurement is not lower than 10 kV, or a flowability is not less than 4 times, an apparent density is not lower than 0.45 g/cm$^3$ and a dielectric breakdown voltage of molded articles a2 for measurement is not lower than 9.1 kV. Desirable is the latter case.

More preferably, in the above PTFE powder (7), a flowability is not less than 0.5 times, an apparent density is not lower than 0.45 g/cm$^3$ and a dielectric breakdown voltage of molded articles a2 for measurement is not lower than 12 kV, or a flowability is not less than 4 times, an apparent density is not lower than 0.6 g/cm$^3$ and a dielectric breakdown voltage of molded articles a2 for measurement is not lower than 9.1 kV. The latter one is particularly preferred as the PTFE powder (7).

Preferred as the PTFE powder (7) are the above-mentioned PTFE powder (I'), PTFE powder (II') and PTFE powder (III'). Preferred as the PTFE powder (I') is one obtained by subjecting the PTFE powder (I) with an average particle diameter of 1 to 13 μm to the above-mentioned granulation.

The PTFE powder (7) can be properly used without being particularly restricted, for example, for producing the moldings required to show high levels of dielectric breakdown voltage, high levels of apparent density, and high levels of powder flowability for productivity enhancement, for example in molding insulating tapes, insulated nozzles and so forth.

(8) The PTFE powder of the present invention is characterized in that a tensile strength of molded articles a3 for measurement is not lower than 58.7 MPa. In this specification, the PTFE powder of the present invention which has such a feature is referred to as "PTFE powder (8)". When the tensile strength is within the above range, it is possible to obtain moldings having excellent mechanical strength characteristics even upon application of tensile forces. The above range of tensile strength has never been attained with the conventional PTFE powders.

Preferred as the PTFE powder (8) are the above-mentioned PTFE powder (I) and PTFE powder (II). More preferred are the PTFE powder (I) with an average particle diameter of 40 to 60 μm and the PTFE powder (II) with an average particle diameter of 1 to 13 μm.

Preferably, the molded articles a3 for measurement the PTFE powder (8) have a tensile strength of not lower than 60 MPa.

More preferably, the PTFE powder (8) is one such that a tensile strength of molded articles a3 for measurement is not lower than 65 MPa. Preferred as such PTFE powder (8) is the above-mentioned PTFE powder (II) having an average particle diameter of 1 to 13 μm.

The PTFE powder (8) can be adequately used without being particularly restricted, for example, in the production of moldings required to show a high tensile strength, such as seal rings, ball valve seats, etc.

(9) The PTFE powder of the present invention is characterized in that a tensile elongation of molded articles a3 for measurement is not less than 556%. In this specification, the PTFE powder of the present invention which has such a feature is referred to as "PTFE powder (9)". When the tensile elongation is within the above range, it is possible to obtain moldings having a high elongation upon stretching and hardly undergoing breakage on the occasion of mounting thereof on apparatus, devices and so forth and/or processing thereof. The above range of tensile elongation has never been attained with the prior art PTFE powders.

Preferred as the PTFE powder (9) are the above-mentioned PTFE powder (I), PTFE powder (II) and PTFE powder (III). More preferred are the PTFE powder (I) with an average particle diameter of 1 to 6 μm, the PTFE powder (II) with an average particle diameter of 1 to 6 μm, and the PTFE powder (III) with an average particle diameter of 1 to 13 μm.

Preferably, the PTFE powder (9) is one such that a tensile elongation of molded articles a3 for measurement is not less than 600%. Preferred as such PTFE powder (9) is the PTFE powder (II) with an average particle diameter of 1 to 6 μm.

The PTFE powder (9) can be appropriately used without being particularly restricted, for example, for producing the moldings required to show a high tensile elongation, such as endless type seal rings and so forth.

(10) The PTFE powder of the present invention is characterized in that an apparent density is not lower than 0.45 g/cm$^3$ and a tensile elongation of molded articles a3 for measurement is not less than 431%. In this specification, the PTFE powder of the present invention which has such features is referred to as "PTFE powder (10)". When the apparent density and tensile elongation are within the above respective ranges, it becomes possible to prevent bridging in the hopper and/or reduce the sizes of molds and so forth and, in addition, moldings having a high elongation upon stretching and hardly undergoing breakage on the occasion of mounting thereof on apparatus, devices and so forth and/or processing thereof can be obtained.

Preferably, in the above PTFE powder (10), an apparent density is not lower than 0.6 g/cm$^3$ and a tensile elongation of molded articles a3 for measurement is not less than 450%.

Preferred as the PTFE powder (10) is the above-mentioned PTFE powder (I'). More preferred is the one produced by subjecting the PTFE powder (I) with an average particle diameter of 1 to 13 μm to the above-mentioned granulation.

The PTFE powder (10) can be appropriately used without being particularly restricted, for example, for producing the moldings required to show high levels of tensile elongation and high levels of apparent density for productivity enhancement, for example in molding endless type seal rings and so forth.

(11) The PTFE powder of the present invention is characterized in that a surface roughness Ra of molded articles a1 for measurement is less than 1.5 μm and a tensile strength of molded articles a3 for measurement is not lower than 47.8 MPa. In this specification, the PTFE powder of the present invention which has such features is referred to as "PTFE powder (11)". When the surface roughness Ra and tensile strength are within the above respective ranges, moldings excellent in surface smoothness and having high levels of mechanical strength even upon application of tensile forces can be obtained.

Preferred as the PTFE powder (11) are the above-mentioned PTFE powder (I), PTFE powder (II) and PTFE powder (III).

The PTFE powder (11) is preferably one such that a surface roughness of molded articles a1 for measurement is less than 1.2 μm and a tensile strength of molded articles a3 for measurement is not lower than 50 MPa, or one such that a surface roughness Ra of molded articles a1 for measurement is less than 1.5 μm and a tensile strength of molded articles a3 for measurement is not lower than 65 MPa. The latter is more desirable than the former.

Preferred as the former are the above-mentioned PTFE powder (I) and PTFE powder (II); more preferred are those respectively having an average particle diameter of 13 to 60 μm. Preferred as the latter is the above-mentioned PTFE powder (II); the PTFE powder (II) with an average particle diameter of 1 to 13 μm is more preferred.

More preferably, the PTFE powder (11) is one such that a surface roughness Ra of molded articles a1 for measurement is less than 1.5 μm and a tensile strength of molded articles a3 for measurement is not lower than 65 MPa.

The PTFE powder (11) can be adequately used without being particularly restricted, for example, for producing the moldings required to show a low surface roughness and a high tensile strength, for example in molding ball valve seats.

(12) The PTFE powder of the present invention is characterized in that a surface roughness Ra of molded articles a1 for measurement is less than 1.2 μm and a tensile elongation of molded articles a3 for measurement is not less than 423%. In this specification, the PTFE powder of the present invention which has such features is referred to as "PTFE powder (12)". When the surface roughness Ra and tensile elongation are within the above respective ranges, moldings excellent in surface smoothness, having a high elongation upon stretching and hardly undergoing breakage on the occasion of mounting thereof on apparatus, devices and so forth and/or processing thereof can be obtained.

Preferred as the PTFE powder (12) are the above-mentioned PTFE powder (I), PTFE powder (II), PTFE powder (III) and PTFE powder (I'). Preferred as the PTFE powder (I') is the one with an average particle diameter of 20 to 250 μm as obtained by subjecting the PTFE powder (I) with an average particle diameter of 6 to 13 μm to the above-mentioned granulation.

Preferably, the PTFE powder (12) is one such that a surface roughness Ra of molded articles a1 for measurement is less than 0.92 μm and a tensile elongation of molded articles a3 for measurement is not less than 556%. Preferred as such powder (12) are the above-mentioned PTFE powder (I) and PTFE powder (II). More preferred are the PTFE powder (I) with an average particle diameter of 1 to 6 μm and the PTFE powder (II) with an average particle diameter of 1 to 13 μm.

The PTFE powder (12) can be adequately used without being particularly restricted, for example, for producing the moldings required to show a high elongation on the occasion of mounting thereof on apparatus, devices and so forth, and a low surface roughness without need of cutting, for example in molding uncut seal rings.

(13) The PTFE powder of the present invention is characterized in that an apparent density is not lower than 0.45 g/cm$^3$, a surface roughness Ra of molded articles a1 for measurement is less than 2.4 μm and a tensile elongation of molded articles a3 for measurement is not less than 370%. In this specification, the PTFE powder of the present invention which has such features is referred to as "PTFE powder (13)". When the apparent density, surface roughness Ra and tensile elongation are within the above respective ranges, it becomes possible to prevent bridging in the hopper and/or reduce the sizes of molds and so forth and, in addition, moldings excellent in surface smoothness and having a high elongation upon stretching and, therefore, hardly undergoing breakage on the occasion of mounting thereof on apparatus, devices and so forth and/or processing thereof can be obtained.

Preferred as the PTFE powder (13) are the above-mentioned PTFE powder (I') and PTFE powder (II').

Preferably, in the PTFE powder (13), an apparent density is not lower than 0.45 g/cm$^3$, a surface roughness Ra of molded articles a1 for measurement is less than 1.9 μm and a tensile elongation of molded articles a3 for measurement is not less than 400%, or an apparent density is not lower than 0.6 g/cm$^3$, a surface roughness Ra of molded articles a1 for measurement is less than 2.4 μm and a tensile elongation of molded articles a3 for measurement is not less than 370%. The latter is more desirable than the former. The above-mentioned PTFE powder (I') is preferred as the former. The above-mentioned PTFE powder (I') and PTFE powder (II') are preferred as the latter.

More preferably, in the PTFE powder (13), a flowability is not less than 4 times, an apparent density is not lower than 0.6 g/cm$^3$, a surface roughness Ra of molded articles a1 for measurement is less than 1.9 µm and a tensile elongation of molded articles a3 for measurement is not less than 400%. Preferred as such PTFE powder (13) is the above-mentioned PTFE powder (I').

The PTFE powder (13) can be adequately used without being particularly restricted, for example, for producing the moldings required, from the productivity viewpoint, to show high levels of apparent density, low levels of surface roughness without need of cutting and high levels of elongation on the occasion of mounting thereof on apparatus, devices and so forth, for example in molding uncut seal rings.

(14) The PTFE powder of the present invention is characterized in that a flowability is not less than 0.5 times, a surface roughness Ra of molded articles a1 for measurement is less than 2.4 µm and a tensile elongation of molded articles a3 for measurement is not less than 370%. In this specification, the PTFE powder of the present invention which has such features is referred to as "PTFE powder (14)". When the flowability, surface roughness Ra and tensile elongation are within the above respective ranges, it becomes possible to prevent bridging in the hopper and, in addition, moldings excellent in surface smoothness and having a high elongation upon stretching and, therefore, hardly undergoing breakage on the occasion of mounting thereof on apparatus, devices and so forth and/or processing thereof can be obtained.

Preferred as the PTFE powder (14) are the above-mentioned PTFE powder (I') and PTFE powder (II').

Preferably, in the PTFE powder (14), a flowability is not less than 4 times, a surface roughness Ra of molded articles a1 for measurement is less than 2.4 µm and a tensile elongation of molded articles a3 for measurement is not less than 370%, or a flowability is not less than 4 times, a surface roughness Ra of molded articles a1 for measurement is less than 1.9 µm and a tensile elongation of molded articles a3 for measurement is not less than 400%. The latter is more desirable than the former. The above-mentioned PTFE powder (I') and PTFE powder (II') are preferred as the former. The above-mentioned PTFE powder (I') is preferred as the latter.

The PTFE powder (14) can be adequately used without being particularly restricted, for example, for producing the moldings required, from the productivity viewpoint, to show high levels of powder flowability, low levels of surface roughness without need of cutting, and high levels of elongation on the occasion of mounting thereof on apparatus, devices and so forth, for example in molding uncut seal rings.

(15) The PTFE powder of the present invention is characterized in that a flowability is not less than 0.5 times, an apparent density of not lower than 0.45 g/cm$^3$, a surface roughness Ra of molded articles a1 for measurement is less than 2.4 µm and a tensile elongation of molded articles a3 for measurement is not less than 370%. In this specification, the PTFE powder of the present invention which has such features is referred to as "PTFE powder (15)". When the flowability, apparent density, surface roughness Ra and tensile elongation are within the above respective ranges, it becomes possible to prevent bridging in the hopper and/or reduce the sizes of molds and so forth and, in addition, moldings excellent in surface smoothness and having a high elongation upon stretching and, therefore, hardly undergoing breakage on the occasion of mounting thereof on apparatus, devices and so forth and/or processing thereof can be obtained.

Preferred as the PTFE powder (15) are the above-mentioned PTFE powder (I') and PTFE powder (II').

Preferably, in the PTFE powder (15), a flowability of not less than 0.5 times and an apparent density is not lower than 0.6 g/cm$^3$, a surface roughness Ra of molded articles a1 for measurement is less than 2.4 µm and a tensile elongation of molded articles a3 for measurement is not less than 370%, or a flowability is not less than 4 times and an apparent density is not lower than 0.45 g/cm$^3$, a surface roughness Ra of molded articles a1 for measurement is less than 2.4 µm and a tensile elongation of molded articles a3 for measurement is not less than 370%. The latter is more desirable than the former.

More preferably, in the PTFE powder (15), a flowability is not less than 4 times, an apparent density is not lower than 0.6 g/cm$^3$, a surface roughness Ra of molded articles a1 for measurement is less than 2.4 µm and a tensile elongation of molded articles a3 for measurement is not less than 370%.

The PTFE powder (15) can be adequately used without being particularly restricted, for example, for producing the moldings required, from the productivity viewpoint, to show high levels of flowability, high levels of apparent density, and low levels of surface roughness without need of cutting and to show high levels of elongation on the occasion of mounting thereof on apparatus, devices and so forth, for example in molding uncut seal rings.

(16) The PTFE powder of the present invention is characterized in that a surface roughness Ra of molded articles a1 for measurement is not less than 0.92 µm and a dielectric breakdown voltage of molded articles a2 for measurement is not lower than 10 kV. In this specification, the PTFE powder of the present invention which has such features is referred to as "PTFE powder (16)". When the surface roughness Ra and dielectric breakdown voltage are within the above respective ranges, moldings excellent in surface smoothness and high in dielectric breakdown voltage can be obtained.

Preferred as the PTFE powder (16) are the above-mentioned PTFE powder (I) and PTFE powder (III). More preferred are the PTFE powder (I) with an average particle diameter of 1 to 25 µm and the PTFE powder (III) with an average particle diameter of 1 to 13 µm.

Preferably, the PTFE powder (16) is one such that a surface roughness Ra of molded articles a1 for measurement is less than 0.8 µm and a dielectric breakdown voltage of molded articles a2 for measurement is not lower than 12 kV. Preferred as such PTFE powder (16) is the PTFE powder (I) with an average particle diameter of 1 to 25 µm.

The PTFE powder (16) can be appropriately used without being particularly restricted, for example, for producing the moldings required to show a low surface roughness and a high dielectric breakdown voltage, such as insulating tapes, insulated nozzles and so forth.

(17) The PTFE powder of the present invention is characterized in that an apparent density is not lower than 0.45 g/cm$^3$, a surface roughness Ra of molded articles a1 for measurement is less than 2.5 µm and a dielectric breakdown voltage of molded articles a2 for measurement is not lower than 8.5 kV. In this specification, the PTFE powder of the present invention which has such features is referred to as "PTFE powder (17)". When the apparent density, surface roughness Ra and dielectric breakdown voltage are within the above respective ranges, it becomes possible to prevent bridging in the hopper and reduce the sizes of molds and so forth and, in addition, moldings excellent in surface smoothness and high in dielectric breakdown voltage can be obtained.

Preferred as the PTFE powder (17) are the above-mentioned PTFE powder (I') and PTFE powder (II').

Preferably, in the above PTFE powder (17), an apparent density is not lower than 0.6 g/cm$^3$, a surface roughness of molded articles a1 for measurement is less than 2.5 µm and a dielectric breakdown voltage of molded articles a2 for measurement is not lower than 8.5 kV.

More preferably, in the above PTFE powder (17), an apparent density is not lower than 0.8 g/cm³, a surface roughness Ra of molded articles a1 for measurement is less than 2.5 µm and a dielectric breakdown voltage of molded articles a2 for measurement is not lower than 8.5 kV. Preferred as such PTFE powder (17) is the above-mentioned PTFE powder (I').

The PTFE powder (17) can be adequately used without being particularly restricted, for example, for producing the moldings required, from the productivity viewpoint, to show high levels of apparent density, low levels of surface roughness and high levels of dielectric breakdown voltage, for example in molding insulating tapes, insulated nozzles, etc.

(18) The PTFE powder of the present invention is characterized in that a flowability is not less than 0.5 times, a surface roughness Ra of molded articles a1 for measurement is less than 2.5 µm and a dielectric breakdown voltage of molded articles a2 for measurement is not lower than 8.5 kV. In this specification, the PTFE powder of the present invention which has such features is referred to as "PTFE powder (18)". When the flowability, surface roughness Ra and dielectric breakdown voltage are within the above respective ranges, it becomes possible to prevent bridging in the hopper and, in addition, moldings excellent in surface smoothness and high in dielectric breakdown voltage can be obtained.

Preferred as the PTFE powder (18) are the above-mentioned PTFE powder (I') and PTFE powder (II').

Preferably, in the above PTFE powder (18), a flowability is not less than 0.5 times, a surface roughness Ra of molded articles a1 for measurement is less than 1.9 µm and a dielectric breakdown voltage of molded articles a2 for measurement is not lower than 9.1 kV, or a flowability is not less than 4 times, a surface roughness Ra of molded articles a1 for measurement is less than 2.5 µm and a dielectric breakdown voltage of molded articles a2 for measurement is not lower than 8.5 KV. Desirable is the latter case.

More preferably, in the above PTFE powder (18), a flowability is not less than 4 times, a surface roughness Ra of molded articles a1 for measurement is less than 1.9 µm and a dielectric breakdown voltage of molded articles a2 for measurement is not lower than 9.1 kV. Preferred as such PTFE powder (18) is the above-mentioned PTFE powder (I').

The PTFE powder (18) can be adequately used without being particularly restricted, for example, for producing the moldings required, from the productivity viewpoint, to show high levels of powder flowability, low levels of surface roughness and high levels of dielectric breakdown voltage, for example in molding insulating tapes, insulated nozzles, etc.

(19) The PTFE powder of the present invention is characterized in that a flowability is not less than 0.5 times, an apparent density is not lower than 0.45 g/cm³, a surface roughness Ra of molded articles a1 for measurement is less than 2.5 µm and a dielectric breakdown voltage of molded articles a2 for measurement is not lower than 8.5 kV. In this specification, the PTFE powder of the present invention which has such features is referred to as "PTFE powder (19)". When the flowability, apparent density, surface roughness Ra and dielectric breakdown voltage are within the above respective ranges, it becomes possible to prevent bridging in the hopper and reduce the sizes of molds and so forth and, in addition, moldings excellent in surface smoothness and high in dielectric breakdown strength can be obtained.

Preferred as the PTFE powder (19) are the above-mentioned PTFE powder (I') and PTFE powder (II').

Preferably, in the above PTFE powder (19), a flowability is not less than 0.5 times and an apparent density is not lower than 0.6 g/cm³, a surface roughness Ra of molded articles a1 for measurement is less than 2.5 µm and a dielectric breakdown voltage of molded articles a2 for measurement is not lower than 8.5 kV, or a flowability is not less than 4 times and an apparent density is not lower than 0.45 g/cm³, a surface roughness Ra of molded articles a1 for measurement is less than 2.5 µm and a dielectric breakdown voltage of molded articles a2 for measurement is not lower than 8.5 kV. Desirable is the latter case.

More preferably, in the above PTFE powder (19), a flowability is not less than 4 times and an apparent density is not lower than 0.6 g/cm³, a surface roughness Ra of molded articles a1 for measurement is less than 2.5 µm and a dielectric breakdown voltage of molded articles a2 for measurement is not lower than 8.5 kV.

The PTFE powder (19) can be adequately used, for example, for producing the moldings required, from the productivity viewpoint, to show high levels of powder flowability and of apparent density, low levels of surface roughness and high levels of dielectric breakdown voltage, for example in molding insulating tapes, insulated nozzles and so forth.

(20) The PTFE powder of the present invention is characterized in that a tensile strength of molded articles a3 for measurement is not lower than 47.8 MPa and a tensile elongation of molded articles a3 for measurement is not less than 451%. In this specification, the PTFE powder of the present invention which has such features is referred to as "PTFE powder (20)". When the tensile strength and tensile elongation are within the above respective ranges, moldings excellent in mechanical strength even upon application of tensile forces, having a high elongation and hardly undergoing breakage on the occasion of mounting thereof on apparatus, devices and so forth and/or processing thereof can be obtained.

Preferred as the PTFE powder (20) are the above-mentioned PTFE powder (I), PTFE powder (II) and PTFE powder (III).

Preferably, in the above PTFE powder (20), a tensile strength of molded articles a3 for measurement is not lower than 50 MPa and a tensile elongation of molded articles a3 for measurement is not less than 500%. Preferred as such PTFE powder (20) is the above-mentioned PTFE powder (II).

More preferably, in the above PTFE powder (20), a tensile strength of molded articles a3 for measurement is not lower than 65 MPa and a tensile elongation of molded articles a3 for measurement is not less than 550%.

The PTFE powder (20) can be properly used without being particularly restricted, for example, for producing the moldings required to show high levels of elongation on the occasion of mounting thereof on apparatus, devices and so forth and further to show high levels of strength, for example in molding endless type seal rings.

(21) The PTFE powder of the present invention is characterized in that a dielectric breakdown voltage of molded articles a2 for measurement is not lower than 11.5 kV and a tensile strength of molded articles a3 for measurement is not lower than 47.8 MPa. In this specification, the PTFE powder of the present invention which has such features is referred to as "PTFE powder (21)". When the dielectric breakdown voltage and tensile strength are within the above respective ranges, moldings high in dielectric breakdown strength and excellent in mechanical strength even upon application of tensile forces can be obtained.

Preferred as the PTFE powder (21) are the above-mentioned PTFE powder (I), PTFE powder (II) and PTFE powder (III).

Preferably, in the above PTFE powder (21), a dielectric breakdown voltage of molded articles a2 for measurement is not lower than 12 kV and a tensile strength of molded articles a3 for measurement is not lower than 50 MPa. Preferred as such PTFE powder (21) are the above-mentioned PTFE powder (I) and PTFE powder (II). Preferably, the PTFE powder (I) has an average particle diameter of 13 to 60 μm.

More preferably, in the above PTFE powder (21), a dielectric breakdown voltage of molded articles a2 for measurement is not lower than 13 kV and a tensile strength of molded articles a3 for measurement is not lower than 65 MPa. Preferred as such PTFE powder (21) is the above-mentioned PTFE powder (II).

The PTFE powder (21) can be adequately used without being particularly restricted, for example, for producing the moldings required to show high dielectric breakdown voltage and high levels of strength on the occasion of winding thereof around apparatus, devices and so forth, for example in molding insulating tapes and insulated nozzles.

(22) The PTFE powder of the present invention is characterized in that a dielectric breakdown voltage of molded articles a2 for measurement is not lower than 10 kV and a tensile elongation of molded articles a3 for measurement is not less than 556%. In this specification, the PTFE powder of the present invention which has such features is referred to as "PTFE powder (22)". When the dielectric breakdown voltage and tensile elongation are within the above respective ranges, moldings having a high dielectric breakdown strength, having a high elongation upon stretching and hardly undergoing breakage on the occasion of mounting thereof on apparatus, devices and so forth and/or processing thereof can be obtained.

Preferred as the PTFE powder (22) are the above-mentioned PTFE powder (I), PTFE powder (II) and PTFE powder (III). More preferred are the PTFE powder (I) with an average particle diameter of 1 to 6 μm, the PTFE powder (II) with an average article diameter of 1 to 6 μm and the PTFE powder (III) with an average particle diameter of 1 to 13 μm.

Preferably, in the PTFE powder (22), a dielectric breakdown voltage of molded articles a2 for measurement is not lower than 13 kV and a tensile elongation of molded articles a3 for measurement is not less than 600%. Preferred as such PTFE particle (22) is the above-mentioned PTFE powder (III) with an average particle diameter of 1 to 13 μm.

The PTFE powder (22) can be adequately used without being particularly restricted, for example, for producing the moldings required to show a high dielectric breakdown voltage and a high elongation on the occasion of mounting thereof on apparatus, devices and so forth, for example in molding insulating tapes and insulated nozzles.

(23) The PTFE powder of the present invention is characterized in that a surface roughness Ra of molded articles a1 for measurement is less than 1.2 μm, a tensile strength of molded articles a3 for measurement is not lower than 47.8 MPa and a tensile elongation of molded articles a3 for measurement is not less than 423%. In this specification, the PTFE powder of the present invention which has such features is referred to as "PTFE powder (23)". When the surface roughness Ra tensile strength and tensile elongation are within the above respective ranges, it is possible to obtain moldings which are excellent in surface smoothness and in mechanical strength even upon application of tensile forces, show high levels of elongation and hardly undergo breakage on the occasion of mounting thereof on apparatus, devices and so forth and/or processing thereof.

Preferred as the PTFE powder (23) are the above-mentioned PTFE powder (I), PTFE powder (II) and PTFE powder (III).

Preferably, in the PTFE powder (23), a surface roughness Ra of molded articles a1 for measurement is less than 0.92 μm, a tensile strength of molded articles a3 for measurement is not lower than 47.8 MPa and a tensile elongation of molded articles a3 for measurement is not less than 556%. Preferred as such PTFE powder (23) is the PTFE powder (III) with an average particle diameter of 1 to 13 μm.

The PTFE powder (23) can be appropriately used without being particularly restricted, for example, for producing the moldings required to show a low surface roughness without any cutting, a high strength and elongation on the occasion of mounting thereof on apparatus, devices and so forth, for example in molding uncut seal rings.

(24) The PTFE powder of the present invention is characterized in that a dielectric breakdown voltage of molded articles a2 for measurement is not lower than 10 kV, a tensile strength of molded articles a3 for measurement is not lower than 47.8 MPa and a tensile elongation of molded articles a3 for measurement is not less than 451%. In this specification, the PTFE powder of the present invention which has such features is referred to as "PTFE powder (24)". When the dielectric breakdown voltage, tensile strength and tensile elongation are within the above respective ranges, it is possible to obtain moldings which are high in dielectric breakdown strength and excellent in mechanical strength even upon application of tensile forces, show high levels of elongation and hardly undergo breakage on the occasion of mounting thereof on apparatus, devices and so forth and/or processing thereof.

Preferred as the PTFE powder (24) are the above-mentioned PTFE powder (I), PTFE powder (II) and PTFE powder (III). More preferred are the PTFE powder (I) with an average particle diameter of 6 to 13 μm, the PTFE powder (II) with an average particle diameter of 1 to 13 μm and the PTFE powder (III) with an average particle diameter of 1 to 13 μm.

Preferably, in the above PTFE powder (24), a dielectric breakdown voltage of molded articles a2 for measurement is not lower than 13 kV, a tensile strength of molded articles a3 for measurement is not lower than 47.8 MPa and a tensile elongation of molded articles a3 for measurement is not less than 451%.

More preferably, in the PTFE powder (24), a dielectric breakdown voltage of molded articles a2 for measurement is not lower than 13 kV, a tensile strength of molded articles a3 for measurement is not lower than 65 MPa and a tensile elongation of molded articles a3 for measurement is not less than 500%. Preferred as such PTFE powder (24) is the PTFE powder (II) with an average particle diameter of 6 to 13 μm.

The PTFE powder (24) can be appropriately used without being particularly restricted, for example, for producing the moldings required to show high levels of dielectric breakdown voltage, high levels of strength and elongation on the occasion of mounting thereof on apparatus, devices and so forth, for example in molding insulating tapes and insulated nozzles.

As described above, the PTFE powder of the present invention can give moldings more improved in surface roughness Ra tensile strength and/or tensile elongation as compared with the prior art moldings and, further, improved in dielectric breakdown strength and, if desired, it can be improved in apparent density and/or powder flowability.

Therefore, the PTFE powder of the present invention can be favorably used in the production of various moldings, for example moldings required to show at least one of the above physical characteristics of moldings, and moldings for which such surface smoothening treatment as cutting is not desirable. Since the PTFE powder of the present invention is excellent in the above physical characteristics of moldings even when the pressure in the step of compression molding is lowered, it is suited for use in forming the so-called large-sized moldings.

The method of molding which comprises using the PTFE powder of the present invention is not particularly restricted but, for example, those methods generally applied to molding powders of PTFE-based polymers can be used. Thus, for example, such sintering molding methods as the compression molding method and ram extrusion method are used with advantage. The molding conditions of each molding method are not particularly restricted but, for example, those known in the art can be used while making judicious selections according to the intended use.

In the step of molding by using the PTFE powder of the present invention, good powder characteristics can be obtained, where desired, so that bridging in the hopper can be prevented, the handleability is improved, enabling uniform filling in molds and small-diameter cylinders of the molding machine and the molds and so forth can be reduced in size. Thus, the powder can be properly used in automatic compression molding machines as well.

The method of producing PTFE molding powders according to the present invention serves to produce the PTFE molding powder of the present invention.

In this specification, the term "PTFE molding powder" refers to a powdery solid which comprises a PTFE-based polymer, is used for molding and is obtained by the method of producing PTFE molding powders according to the present invention. The PTFE-based polymer comprises a modified PTFE and/or not-modified PTFE, as described hereinabove referring to the PTFE powder of the present invention. The above-mentioned molding is not particularly restricted but the molding powder can be advantageously used in compression molding, ram extrusion molding, isotactic molding, etc.

The method of producing PTFE molding powders according to the present invention comprises pulverizing an unpulverized PTFE powder.

The unpulverized PTFE powder comprises a PTFE-based polymer obtained by suspension polymerization.

When it is obtained by suspension polymerization, the unpulverized PTFE powder may comprise an not-modified PTFE alone, a modified PTFE alone, or an not-modified PTFE and a modified PTFE, or may be a mixture containing a filler(s), an additive(s) and so forth as added thereto.

The "modified PTFE" mentioned above means a copolymer comprising tetrafluoroethylene [TFE] and a small proportion of some other comonomer(s) as monomer components, which is obtained by copolymerization of these components, as described hereinabove referring to the PTFE powder of the present invention.

As the other comonomers, there may be mentioned the same other comonomers as mentioned hereinabove referring to the PTFE powder of the present invention.

The mole ratio of the above-mentioned tetrafluoroethylene and other comonomer(s) in the modified PTFE may vary depending on the type. Generally, however, the ratio tetrafluoroethylene:other comonomer(s) is preferably 99:1 to 99.999:0.001. When the content of the other comonomer(s) is less than 0.001 mole percent, the creep resistance (total deformation) may decrease in some instances and, when it exceeds 1 mole percent, the tensile strength, among others, tends to decrease. In cases where a perfluorovinylether, which is expensive, is used, the improvement in creep resistance will be no more proportional to the content thereof with economic disadvantages in certain instances. The ratio is more preferably 99.97:0.03 to 99.8:0.2. A more preferred lower limit of the content of the other comonomer(s) is 0.03% relative to the total number of moles of the above-mentioned tetrafluoroethylene and other comonomer(s), and a more preferred upper limit is 0.2 mole percent.

In carrying out the method of producing PTFE molding powders according to the present invention, the modified PTFE preferably has a heat of crystallization of 18 to 25 J/g.

The heat of crystallization serves as an index of the molecular weight of the PTFE-based polymer, and a higher heat of crystallization tends to indicate a higher molecular weight. When the above-mentioned modified PTFE has a relatively high molecular weight due to the heat of crystallization within the above range, and the moldings formed from the PTFE molding powder obtained tend to be superior in the physical characteristics of moldings mentioned later herein. A more preferred upper limit is 23.5 J/g, hence a more preferred range is 18 to 23.5 µg.

The above-mentioned modified PTFE preferably has a standard specific gravity [SSG] of not more than 2.16. The SSG serves as an index of the molecular weight of the PTFE-based polymer, and a lower SSG tends to indicate a higher molecular weight. When the SSG is within the above range, the modified PTFE has a relatively high molecular weight, and the moldings formed from the PTFE molding powder obtained tend to be superior in the physical characteristics of moldings to be mentioned later herein. A preferred lower limit is 2.14, hence a preferred range is 2.14 to 2.16.

In this specification, the SSG is determined according to ASTM D-4894. Thus, 12 g of the measurement target powder is molded in a cylindrical mold with a diameter of 28.6 mm, the moldings obtained are sintered, namely heated from an initial temperature set at 290° C. to 360° C. at a heating rate of 120° C./minute, maintained at that temperature for 30 minutes, then cooled to 294° C. at a cooling rate of 60° C./minute, and maintained at that temperature for 24 minutes, and the sintered products obtained are subjected to measurement using an automatic hydrometer (trademark, product of Shimadzu Corporation).

As the above-mentioned modified PTFE, may be used one single species or two or more species differing in average molecular weight, copolymer composition, SSG and/or heat of crystallization.

In this specification, the term "not-modified PTFE" means a homopolymer of TFE as obtained by polymerization thereof without using any other comonomer as a monomer component, like in the case of the not-modified PTFE mentioned hereinabove referring to the PTFE powder of the present invention.

The above not-modified PTFE preferably has an amorphous index [AI] of not lower than 0.25.

Therefore, the above-mentioned not-modified PTFE (homo-PTFE) has a very low crystallinity because of its having an AI value within the above range, as described hereinabove referring to the PTFE powder of the present invention, and the moldings formed from the above-mentioned PTFE molding powder obtained tend to be excellent in physical characteristics of moldings, as described later herein. While the AI value may be 0.25 to 0.4, a preferred lower limit thereto is 0.3, hence a preferred range is 0.3 to 0.4.

As the above not-modified PTFE, may be used one single species or two or more species differing in AI value and/or average molecular weight, for instance.

In the method of producing PTFE molding powders according to the present invention, the PTFE-based polymer is one obtained by suspension polymerization.

The conditions in carrying out the above suspension polymerization are not particularly restricted but, like in the suspension polymerization described hereinabove referring to the PTFE powder of the present invention, the method described in WO 93/16126, for instance, is preferably employed.

In the polymerization reaction for obtaining the above-mentioned modified PTFE, the heat of crystallization can be adjusted within the above range by selecting an initiator having a half-life or rate of decomposition within the range mentioned above and/or by adjusting the polymerization temperature and polymerization time, for instance.

In the polymerization reaction for obtaining the above-mentioned not-modified PTFE, an AI value within the range mentioned above can be obtained with ease, for example, by selecting the polymerization temperature for the PTFE-based polymer at a relatively low level. The polymerization temperature for the PTFE-based polymer at which an AI value within the above range can be obtained with ease is the same as the polymerization temperature described hereinabove referring to the AI of the PTFE powder (I).

In the above polymerization, an emulsifier may be added, like in the polymerization described hereinabove referring to the PTFE powder of the present invention.

The polymerization time is generally 8 to 25 hours.

The PTFE-based polymer resulting from the above polymerization can be separated as a virgin polymer just obtained by polymerization.

The method of producing PTFE molding powders according to the present invention comprises pulverizing the above-mentioned unpulverized PTFE powder.

In this specification, the terminology "unpulverized PTFE powder" indicates the virgin polymer of a PTFE-based polymer just obtained by polymerization and subjected to rough grinding, washing and/or drying according to need but not yet subjected to the above-mentioned pulverization or granulation, as described hereinabove referring to the PTFE powder of the present invention.

Therefore, the unpulverized PTFE powder may be the original or raw PTFE-based polymer powder just obtained by polymerization or a powder derived therefrom by rough grinding, washing and/or drying according to need.

The method of carrying out the above-mentioned rough grinding, washing and/or drying is not particularly restricted but any of the methods known in the art can be used, as described hereinabove referring to the PTFE powder of the present invention.

The above pulverization is characterized that it is carried out in such a manner as avoiding substantial fibril-formation of the particles obtained by pulverization.

If the above pulverization does not cause the PTFE molding powder obtained to undergo "substantial fibril-formation", a slight extent of fibril-formation is allowable.

That no substantial fibril-formation occurs with the particles obtained by the above pulverization can also be demonstrated, for example, by electron photomicrographic observation of the particles obtained, which indicates no substantial protrusion of fiber-like pieces on the particle surface and the smoothness of the curved surface of the particles, as described hereinabove referring to the PTFE powder of the present invention.

Preferred as the above method of pulverization is, for example, a method by which the shearing force to be applied during pulverization can be reduced as far as possible. Such method of pulverization is not particularly restricted but includes, among others, the air jet pulverization method, freeze pulverization method, freeze air jet pulverization method, and water jet pulverization method. Such pulverization methods may be employed singly or two or more of them may be used in combination.

The above-mentioned air jet pulverization method comprises emitting jets of compressed air to pulverize resin particles to be reduced in size. The air jet pulverization can be carried out using an air jet pulverizer, for instance. Usable as such method of pulverization are the methods described in Japanese Kokai publications 2000-165035 and 2000-319668, for instance.

The air jet pulverization method may comprise, for example, emitting jets of compressed air from jet nozzles disposed in a pulverizing chamber in a jet pulverizer toward an axial center of the pulverizing chamber while fluidizing, in that chamber, the resin particles to be pulverized as continuously fed from the upper or lower part of the pulverizing chamber, thereby causing collisions of the resin particles to be pulverized with one another and further allowing the particles to collide against the bottom wall of the pulverizing chamber to accomplish pulverization, and recovering those resin particles which have a desired particle diameter as a result of such pulverization.

As for the above jet nozzles, use may be made of three to five jet nozzles having a diameter of 5-10 mm, for instance. The compressed air can be used at a feed rate of 3-30 m$^3$/minute.

As for the bottom wall of the pulverizing chamber, use is made of a bottom wall wholly or partly having a flat surface parallel to the jet nozzles (hereinafter, "bottom wall a") or a bottom wall having a conical protrusion formed just below the focus of jets (hereinafter, "bottom wall b"). The bottom wall a may be wholly flat, for example as shown in partially exploded perspective view in FIG. 3, or may have a flat top surface on a truncated cone disposed on the bottom wall proper, for example as shown in the main part vertical sectional view in FIG. 4.

The jet pulverizer mentioned above is not particularly restricted but may be, for example, the jet pulverizer A shown in FIG. 3 or FIG. 4. As shown in FIG. 3 or FIG. 4, the jet pulverizer A comprises a cylindrical pulverizing chamber 1, a raw material feeding means for feeding the resin particles to be pulverized as disposed in the upper part of the pulverizing chamber 1, a classification means 2 for classifying the resin particles resulting from pulverization as disposed in the upper part of the pulverizing chamber 1, three jet nozzles 6 disposed at appropriate sites on the cylinder wall 4 as properly separated from the bottom wall 3 and directed toward the focus of jets (one point on the axis) in the pulverizing chamber 1, a compressed air generation means, a gas manifold 7 and piping 8 for feeding the compressed air generated to the jet nozzles 6, and a powder collector for collecting the classification product. A hopper or the like may be used as the raw material feeding means, and it is connected to the pulverizing chamber 1 via a feeding pipe 9. The classification means may comprise a classifier rotor 10 and a rotary driving motor. The classifier rotor 10 and the powder collector are connected with each other via a discharge pipe 11.

In the above jet pulverizer A, the resin particles to be pulverized are continuously charged into an upper feed opening 13 of the pulverizing chamber 1 in the direction indicated by an arrow S. They drop through the pulverizing chamber 1 and are driven to the focus of jets by compressed air jet emitted from the jet nozzles 6. The resin particles to be pulverized collide with one another and are then pulverized in the pulverizing zone formed around the focus of jets. The particles as pulverized and scattered due to such collision and pulverization around the focus of jets are mostly caused to collide against the bottom wall 3 by the jet streams from the jet nozzles 6 for further pulverization. On that occasion, the resin particles to be pulverized can be pulverized efficiently and the amount of finely divided particles increases, since the jet nozzles 6 are disposed at locations favorable for pulverization efficiency. The resin particles to be pulverized are suctioned through the discharge pipe 11 by means of the rotational force of the classifier rotor 10 disposed in the upper part of the pulverizing chamber 1 and collected in the powder collector and recovered.

The bottom wall a shown in FIG. 4 has a protrusion 20 in the form of a truncated cone on the bottom wall 3 of the pulverizing chamber 1, and the top face of this truncated cone forms a flat surface 21.

The bottom wall b is provided with a conical protrusion in place of the flat bottom wall a1 mentioned above. By providing such a conical protrusion, it becomes possible to allow the resin particles pulverized by mutual collisions at the focus of jets to collide against the surface of the protrusion for promoting pulverization and, at the same time, smooth the flows of air within the pulverizing chamber to promote the flows of the resin particles to be pulverized and thereby improve the efficiency of collision of particles and, further, facilitate the recovery of the resin particles to be pulverized.

The above-mentioned freeze pulverization method is a method comprising pulverizing the resin particles to be pulverized, which are in a frozen state, by utilizing the impact force by a hammer mill or the like. The resin particles to be pulverized in a frozen state may generally be −100° C. or below, for example in the range of −140 to −110° C.

The freeze pulverization method mentioned above can be carried out using a freeze pulverizer, for instance. As the method of freeze pulverization, there may be mentioned, for example, the method comprising pulverizing the resin particles to be pulverized as frozen by feeding them to a pulverizer together with a low-temperature liquefied gas, such as liquefied nitrogen, by means of an impact pulverizer such as a hammer mill.

The freeze air jet pulverization method mentioned above is a method comprising pulverizing the resin particles to be pulverized which are in a frozen state by means of jets of compressed air. The resin particles to be pulverized which are in a frozen state may generally be −100° C. or below, for example in the range of −140 to −110° C., like in the above-mentioned freeze pulverization.

The above freeze air jet pulverization can be carried out by using such a freeze air jet pulverizer as mentioned above, for instance. The freeze air jet pulverization method may comprise, for example, pulverizing the resin particles frozen by feeding them to the pulverizer together with a liquefied gas, such as liquefied nitrogen, by emitting jets of compressed air in the same manner as in the air jet pulverization method described above.

The water jet pulverization method mentioned above is a method comprising pulverizing the resin particles to be pulverized by emitting jets of water. The water jet pulverization method can be carried out using a water jet pulverizer, for instance. As the water jet pulverization method, there may be mentioned, for example, the method comprising pulverizing the resin particles to be pulverized by means of water jets emitted from the jet nozzles in the pulverizing chamber of the pulverizer.

Preferred as the methods of pulverization are the freeze pulverization method, freeze air jet pulverization method and air jet pulverization method, and the freeze air jet pulverization method is more preferred.

In accordance with the method of producing PTFE molding powders according to the present invention, the pulverization is preferably carried out so that the unpulverized PTFE powder may be pulverized to an average particle diameter of 100 μm or less. The above-described pulverization can give such finely divided particles without substantial fibril-formation. The average particle diameter may be 1 to 100 μm, for instance. From the viewpoint that compact moldings excellent in physical characteristics of moldings can be obtained, a preferred lower limit is 3 μm and a preferred upper limit is 60 μm. Thus, an average particle diameter of 3 to 60 μm is preferred. The average particle diameter can be adjusted within the above range, for example, by adjusting the conditions of the above pulverization and/or classification so that an appropriate value may be obtained according to the desired physical characteristics of moldings, as described later herein.

The average particle diameter after the above pulverization is the value obtained in accordance with the dry laser method, like in the case of the PTFE powder of the present invention described above.

The particles obtained by the prior art pulverization methods show a higher degree of fibril-formation as the particle diameter decreases, and it is difficult in the art to attain pulverization without fibril-formation. In the prior art, such fibril-formation is significant when the average particle diameter after the pulverization is, for example, 100 μm or less, in particular 60 μm or less. According to the present invention, however, particles with an average particle diameter of 100 μm or less, for instance, and showing no substantial fibril-formation can be obtained as the PTFE molding powder.

The PTFE molding powder can be obtained by the above pulverization.

Where desired, the PTFE molding powder may be granulated after the pulverization.

The average particle diameter of the particles obtained by the above-mentioned granulation is not particularly restricted but may be, for example, 30 to 800 μm, like the average grain or particle size of the particles obtained by granulation as described hereinabove referring to the PTFE powder of the present invention. A preferred upper limit is 700 μm, hence the range of 30 to 700 μm is preferred. The average particle diameter can be selected within the above range according to the desired physical characteristics of moldings and powder characteristics.

In this specification, the average particle diameter after the above granulation is the value obtained by the same method as described above referring to the PTFE powder of the present invention, namely the method of determining the average particle diameter of a granular powder as described in WO 98/41569.

The method of the above granulation is not particularly restricted but any of the methods known in the art, for instance, may be used. The underwater granulation method is preferred, however. The underwater granulation method is not particularly restricted but the emulsification/dispersion granulation method is preferred, like in the case of the granulation method described hereinabove referring to the PTFE powder of the present invention.

When the emulsification/dispersion granulation method is employed as the above granulation method, it is considered that the drops of the organic liquid each takes a small and nearly spherical shape on the occasion of granulation, as described hereinabove, and the PTFE-based polymer particles formed in these liquid drops have a small average particle diameter and a nearly spherical shape, with the result that both the apparent density and powder flowability can be improved.

The surfactant to be used in above emulsification/dispersion granulation method and the above-mentioned emulsification/dispersion granulation method may be the same as those mentioned hereinabove referring to the PTFE powder of the present invention.

In or after the above pulverization and/or after the above granulation, classification may be carried out according to need, as mentioned hereinabove referring to the PTFE powder of the present invention. The method of classification is not particularly restricted but any of the methods known in the art, for instance, may be employed. When the classification is carried out after the above granulation, for instance, the above classification can give a PTFE powder granulation product with a relatively small average particle diameter according to the classification conditions. Thus, although the powder characteristics may be deteriorated to some extent, the physical characteristics of moldings can be improved and, in particular, the surface roughness Ra can be reduced to 40%, for instance, and the tensile elongation can be improved to 110-130%, for instance, as compared with the value before classification.

The PTFE molding powder described above may contain, where appropriate, a reinforcement or other filler; an additive and so forth each in an appropriate amount, as described hereinabove referring to the PTFE powder of the present invention. As such filler, additive or the like, may be used one single species or two or more species.

When the PTFE molding powder contains a filler and/or an additive, for instance, it is generally preferred that the filler and/or additive be incorporated after the above pulverization or in the step of the above granulation so that the filler and/or additive may be uniformly dispersed in the PTFE molding powder obtained.

The above-mentioned filler and additive are not particularly restricted but include, among others, the same fillers and additives described hereinabove referring to the PTFE powder of the present invention.

The PTFE molding powder obtained by the above-described method of producing PTFE molding powders according to the present invention, when molded, can give moldings excellent in surface roughness Ra tensile strength [TS] and/or tensile elongation [EL] and may be more improved in surface roughness Ra tensile strength or tensile elongation as compared with the prior art PTFE powders. Further, the above PTFE molding powder, when molded, can give moldings excellent in dielectric breakdown voltage [BDV] and further, where desired, possibly excellent in surface roughness Ra tensile strength and/or tensile elongation.

In this specification, the surface roughness Ra is expressed in terms of the value measured with the molded articles a1 for measurement, the dielectric breakdown voltage is expressed in terms of the value measured with the molded articles a2 for measurement, and the tensile strength and tensile elongation are expressed in terms of the values respectively measured with the molded articles a3 for measurement, as mentioned hereinabove. In the case of the above PTFE molding powder, the above-mentioned molded articles a1 for measurement, molded articles a2 for measurement and molded articles a3 for measurement are prepared by using the above-mentioned PTFE molding powder as the PTFE powder in the methods of measurement of the respective physical characteristics of moldings.

With the above PTFE molding powder, the surface roughness Ra of molded articles a1 for measurement can be reduced to a level below 2.5 μm and, therefore, the moldings obtained from the above PTFE molding powder can generally have surface smoothness with less surface unevenness. Therefore, the PTFE molding powder capable of providing a surface roughness Ra within the above range can be properly used in producing moldings desired to have surface smoothness, for example ball valve seats.

The PTFE molding powder capable of providing a surface roughness Ra within the above range can provide excellent surface smoothness, hence it makes it unnecessary to carry out any surface smoothening treatment even in those cases where some or other surface smoothening treatment, for example cutting, is required in the conventional art. Therefore, it can be appropriately used in producing moldings required to show surface smoothness without involving any cutting step in the production process, for example uncut seal rings and the like.

The PTFE molding powder capable of providing a surface roughness Ra within the above range makes such surface smoothening treatment as cutting unnecessary in some instances and, in those cases, it can be properly used in forming tools/utensils, parts and other moldings for use in the field of semiconductor manufacture where contamination by cutting chips or like impurities is required to be excluded. The moldings for use in the field of semiconductor manufacture are not particularly restricted but include, among others, the same ones as those mentioned hereinabove referring to the PTFE powder of the present invention.

The above-mentioned surface roughness Ra can be reduced preferably to a level lower than 1.9 μm, more preferably lower than 1.2 μm, and can be adjusted within the above range according to the intended use. Generally, the surface roughness Ra may be not less than 0.5 μm, for example not less than 0.55 μm, if it is within the above range.

More preferably, the surface roughness Ra can be reduced to a level lower than 0.92 μm. Any PTFE powder capable of providing such a low surface roughness Ra has never been obtained in the prior art. Preferred as the above-described PTFE molding powder with which the surface roughness Ra becomes less than 0.92 μm are the PTFE molding powder (I) and PTFE molding powder (III) to be described later herein. More preferred are the PTFE molding powder (I) with an average particle diameter of 1-25 μm and the PTFE molding powder (III) with an average particle diameter of 1-13 μm. In particular preferably, the surface roughness Ra can be reduced to a level below 0.8 μm.

The above-mentioned PTFE molding powder capable of providing molded articles a2 for measurement having a dielectric breakdown voltage of not lower than 8.5 kV, for instance, so that the moldings obtained from the PTFE molding powder can generally have excellent high-voltage insulating properties. Therefore, the above PTFE molding powder can be properly used in molding insulating tapes and insulating seals for high-voltage transformer capacitors, and high-voltage insulating materials for circuit breaker insulating nozzles, for instance.

The above dielectric breakdown voltage can amount preferably to 9.1 kV or higher, more preferably 10 kV or higher, still more preferably 12 kV or higher, in particular preferably 13 kV or higher, and can be adjusted within the above range according to the intended use. If it is within the above range, the dielectric breakdown voltage may be 18 kV or lower, for example 15 kV or lower or, further, 14 kV or lower.

The above PTFE molding powder can give molded article a1 for measurement having a surface roughness Ra of less than 0.92 μm and a dielectric breakdown voltage of 10 kV or higher. Preferred as such PTFE molding powder are the PTFE molding powder (I) and PTFE molding powder (III), which are described later herein. More preferred are the PTFE molding powder (I) with an average particle diameter of 1-25 μm and the PTFE molding powder (III) with an average particle diameter of 1-13 μm.

Preferably, the above surface roughness Ra can be reduced to a level lower than 0.8 μm and the dielectric breakdown voltage can be increased to 12 kV or a higher level. Preferred as the PTFE molding powder capable of providing such characteristics is the PTFE molding powder (I) with an average particle diameter of 1-25 μm.

The above PTFE molding powder can provide molded articles a3 for measurement having a tensile strength of not lower than 47.8 MPa, for instance. Therefore, the moldings obtained from the PTFE molding powder can generally show excellent mechanical strength characteristics upon application of a tensile force thereto.

Therefore, the above PTFE molding powder can be appropriately used in producing moldings desired to show high strength on the occasion of mounting thereof on machines, tools and so forth under application of a tensile force, for example in molding seal rings and the like. Suited for use as the seal rings are either ones whose ring has a cut site and which are deformed on the occasion of mounting thereof on tools and so forth, or ones of the so-called endless type which have no cut site in the ring and have a rubber band form.

The above PTFE molding powder, which provides excellent mechanical strength characteristics, can be properly used in producing moldings desired to have high strength but generally not to apply tensile force thereto, for example in molding ball valve seats and the like.

The above tensile strength can amount preferably to 50 MPa or above and can be adjusted within the above range according to the intended use. Generally, the tensile strength may be 70 MPa or below, for example 66 MPa or below, if it is within the above range.

More preferably, the tensile strength can amount to 58.7 MPa or above. Any PTFE powder capable of affording such a high level of tensile strength has not been obtained in the prior art. Preferred as the PTFE molding powder capable of affording a tensile strength of not lower than 58.7 MPa are the PTFE molding powder (I) and PTFE molding powder (II) to be described later herein. More preferred are the PTFE molding powder (I) with an average particle diameter of 40-60 μm and the PTFE molding powder (II) with an average particle diameter of 1-13 μm. More preferably, the tensile strength can amount to 60 MPa or a higher level.

In particular preferably, the tensile strength can amount to 65 MPa or above. Suitable as the PTFE molding powder for attaining such a tensile strength is the PTFE molding powder (II) with an average particle diameter of 1-13 μm.

The above PTFE molding powder can afford a tensile strength of not lower than 47.8 MPa and give molded articles a3 for measurement having a dielectric breakdown voltage of not lower than 11.5 kV. Preferred as such PTFE molding powder are the PTFE molding powder (I), PTFE molding powder (II) and PTFE molding powder (III) to be described later herein.

Preferably, the PTFE molding powder can provide a tensile strength of not lower than 50 MPa and a dielectric breakdown voltage of not lower than 12 kV. Preferred as such PTFE molding powder are the PTFE molding powder (I) and PTFE molding powder (II). Preferred as the PTFE molding powder (I) is one having an average particle diameter of 13-60 μm.

More preferably, the PTFE molding powder can provide a tensile strength of not lower than 65 MPa and a dielectric breakdown voltage of not lower than 13 kV. Preferred as such molding powder is the PTFE molding powder (II).

The above-mentioned PTFE molding powder can provide molded articles a3 for measurement having a tensile elongation of not less than 370%, for instance, so that the moldings obtained from the PTFE molding powder can generally show a high elongation upon application of a tensile force thereto and, therefore, they are prevented from being broken even when a tensile force is applied thereto on the occasion of mounting thereof on machines, tools and so forth or processing thereof.

Therefore, the above PTFE molding powder can be properly used in producing moldings desired to show a high elongation on the occasion of mounting thereof on tools and the like, for example in molding seal rings, among others. The seal rings may be either ones having a cut site in the ring or ones having no cut site in the ring, as described above referring to the tensile strength. The excellent tensile elongation feature can be fully made use of with the latter, however.

The above tensile elongation can amount preferably to 450% or above, more preferably to 500% or above, and can be adjusted within the above range according to the intended use. If it is within the above range, the tensile elongation may be not more than 650%, for example 630% or below.

More preferably, the tensile elongation can amount to 556% or above. Any PTFE powder capable of affording such a high level of tensile elongation has not been obtained in the prior art. Preferred as the PTFE molding powder capable of affording such a tensile elongation are the PTFE molding powder (I), PTFE molding powder (II) and PTFE molding powder (III) to be described later herein. More preferred are the PTFE molding powder (I) with an average particle diameter of 1-6 μm, the PTFE molding powder (II) with an average particle diameter of 1-6 μm and the PTFE molding powder (III) with an average particle diameter of 1-13 μm.

In particular preferably, the tensile elongation can amount to 600% or a higher level. Preferred as such a PTFE molding powder is the PTFE molding powder (II) with an average particle diameter of 1-6 μm.

The above PTFE molding powder can afford a tensile elongation of 556% or above and give molded articles a2 for measurement having a dielectric breakdown voltage of not lower than 10 kV. Preferred as such PTFE molding powder is the PTFE molding powder (I), PTFE molding powder (II) and PTFE molding powder (III). More preferred are the PTFE molding powder (I) with an average particle diameter of 1-6 μm, the PTFE molding powder (II) with an average particle diameter of 1-6 μm and the PTFE molding powder (III) with an average particle diameter of 1-13 μm.

Preferably, the tensile elongation can amount to 600% or more and the dielectric breakdown voltage to 13 kV or a higher level. Preferred as the PTFE molding powder is the PTFE molding powder (III) with an average particle diameter of 1-13 μm.

When the PTFE molding powder is in a granulated form, the powder characteristics, such as powder flowability and apparent density, can be improved according to the granulation conditions without substantially impairing the physical characteristics of moldings mentioned above, namely surface roughness Ra dielectric breakdown voltage, tensile strength and/or tensile elongation.

The PTFE molding powder mentioned above can have a flowability of not less than 0.5 times, for instance. Thus, the handleability thereof can be improved without such troubles as bridging due to aggregation of the molding powder in the hopper or small-diameter cylinder of the molding machine and uneven filling of the powder in the mold or cylinder.

Preferably, the flowability of the above PTFE molding powder can be made at least 4 times. The maximum value of the flowability of the PTFE molding powder is 8 times in view of the measurement method described hereinabove. Generally, the flowability may be 8 times or below, for example 6 times or below, if it is within the above range.

In this specification, the flowability is the value obtained by the measurement method according to that described, for example, in Japanese Kokai Publication Hei-03-259925, as described hereinabove. In the case of the above PTFE molding powder, the PTFE molding powder is used as the powder to be tested in the above-mentioned measurement method.

The above PTFE molding powder can have an apparent density of not lower than 0.45 g/cm$^3$, for instance. Thus, the handleability thereof can be improved, like in the case of its being excellent in powder flowability. In addition, the volume per unit weight as the molding powder can be reduced, so that it becomes possible to reduce the size of the mold or cylinder of the molding machine or to improve the productivity per mold or per cylinder.

The apparent density of the above PTFE molding powder can preferably amount to 0.5 g/cm$^3$ or above, more preferably 0.6 g/cm$^3$ or above, still more preferably 0.7 g/cm$^3$ or above, in particular preferably 0.8 g/cm$^3$ or above. Generally, the apparent density of the PTFE molding powder may be not higher than 1 g/cm$^3$, for example not higher than 0.92 g/cm$^3$ or, further, not higher than 0.85 g/cm$^3$, if it is within the above range.

In this specification, the apparent density is the value obtained by measurement in accordance with JIS K 6891-5.3.

In this specification, the PTFE molding powder obtained by subjecting the above-mentioned unpulverized PTFE powder to the above-mentioned pulverization but not to the above-mentioned granulation, in which the PTFE-based polymer is an not-modified PTFE, is referred to as "PTFE molding powder (I)".

In this specification, the PTFE molding powder obtained by subjecting, to the above-mentioned pulverization but not to the above-mentioned granulation, the above-mentioned unpulverized PTFE powder in which the PTFE-based polymer is the above-mentioned modified PTFE is referred to as "PTFE molding powder (II)".

In this specification, the PTFE molding powder in which the PTFE-based polymer is the above-mentioned modified PTFE and which has an average particle diameter of not greater than 100 μm, has not been subjected to the above-mentioned granulation and is other than the above PTFE molding powder (II) is referred to as "PTFE molding powder (III)".

Therefore, the average particle diameters of the PTFE molding powder (I), PTFE molding powder (II) and PTFE molding powder (III) are respectively the same as the average particle diameters after the above pulverization of the PTFE powders not reduced in particle size.

The average particle diameter of the above-mentioned PTFE molding powder (I) is not particularly restricted but may be 60 μm or less, for instance. When it is within the above range, moldings excellent in surface smoothness, tensile strength, tensile elongation and/or high-voltage insulating properties can be obtained with ease. A preferred lower limit is 1 μm, hence the range of 1-60 μm is preferred.

From the viewpoint that moldings excellent in surface smoothness, in particular, can be obtained, the average particle diameter of the PTFE molding powder (I) is preferably not greater than 25 μm. When it is within the above range, the surface roughness Ra can be lowered as compared with the conventional moldings. Such average particle diameter may be 3-25 μm, for instance.

From the viewpoint that moldings excellent in tensile strength, in particular, can be obtained, the average particle diameter of the PTFE molding powder (I) is preferably 25-60 μm. When it is within the above range, the tensile strength can be increased as compared with the conventional moldings. A preferred lower limit is 40 μm, and a more preferred lower limit is 45 μm. A preferred upper limit is 60 μm, and a more preferred upper limit is 55 μm. Thus, the average particle diameter of the PTFE molding powder (I) is preferably 40-60 μm, more preferably 45-55 μm.

From the viewpoint that moldings excellent in tensile elongation, in particular, can be obtained, the average particle diameter of the PTFE molding powder (I) is preferably not greater than 6 μm. When it is within the above range, the tensile elongation can be increased as compared with the conventional moldings. Such average particle diameter may be 1-6 μm, for instance. However, the more preferred lower limit is 3 μm, hence the range of 3-6 μm is more preferred.

From the excellent tensile strength viewpoint, in particular, the average particle diameter of the PTFE molding powder (I) is preferably 25-60 μm. From the excellent surface roughness Ra and tensile elongation viewpoint, in particular, the average particle diameter of the PTFE molding powder (I) is preferably not greater than 6 μm, and the more preferred lower limit is 1 μm and the still more preferred lower limit is 3 μm, hence the range of 1-6 μm is preferred and the range of 3-6 μm is more preferred. From the viewpoint that the above-mentioned physical characteristics of moldings are generally good, the average particle diameter of the PTFE molding powder (I) is more preferably 25-60 μm.

The reason why the PTFE molding powder (I) is excellent in physical characteristics of moldings in this manner is presumable as follows. Thus, the PTFE molding powder (I) is the product obtained by subjecting the unpulverized PTFE powder to the above pulverization, which comprises the not-modified PTFE having an AI value within the range mentioned hereinabove so that the not-modified PTFE is very low in crystallinity, as described hereinabove.

Therefore, the particles to be pulverized themselves are hardly subject to fibril-formation and, in addition, the above pulverization can be substantially free from fibril-formation, so that the particles obtained by the above pulverization show a significantly reduced level of fibril-formation. As a result, the PTFE molding powder (I) can presumably give moldings lower in surface roughness Ra and higher in tensile strength and tensile elongation as compared with the conventional moldings and, further, high in dielectric breakdown voltage with ease owing to the compressive pressure in the step of molding.

Generally, unlike modified PTFE, not-modified PTFE tends to show a high crystallinity and a low AI. On the contrary, the not-modified PTFE in the practice of the present invention has a high AI value, as mentioned hereinabove, and therefore it is presumable that moldings excellent in physical characteristics of moldings, as mentioned above, can be obtained.

The average particle diameter of the above-mentioned PTFE molding powder (II) is not particularly restricted but may be 60 μm or smaller, for instance. Generally, it may be 1-25 μm. When it is within the above range, moldings excellent in tensile strength, tensile elongation and/or high-voltage insulating properties can be obtained with ease.

From the viewpoint that moldings excellent in tensile strength, in particular, can be obtained, the average particle diameter of the PTFE molding powder (II) is preferably not greater than 13 μm. When it is within the above range, the tensile strength can be increased as compared with the conventional moldings. Such average particle diameter may be 1-13 μm, for instance.

From the viewpoint that moldings excellent in tensile elongation, in particular, can be obtained, the average particle diameter of the PTFE molding powder (II) is preferably not greater than 6 μm. When it is within the above range, the tensile elongation can be increased as compared with the conventional moldings. Such average particle diameter may be 1-6 μm, for instance.

The reason why the PTFE molding powder (II) is excellent in physical characteristics of moldings in this manner is presumable as follows. Thus, the PTFE molding powder (II) is the product obtained by subjecting to the above pulverization the unpulverized PTFE powder which powder comprises the above-mentioned modified PTFE having a heat of crystallization within the range mentioned hereinabove, so that the modified PTFE has a relatively high molecular weight as described hereinabove, and in particular, both mechanical strength and flexibility. Further, in the above pulverization, fibril-formation can be substantially prevented. Therefore, presumably, the PTFE molding powder (II) thus obtained can give moldings higher in tensile strength and tensile elongation as compared with the conventional moldings and, further, high in dielectric breakdown voltage with ease because the PTFE-based polymer provides the mechanical strength and flexibility features.

The average particle diameter of the above-mentioned PTFE molding powder (III) is not particularly restricted but may be 1-25 μm, for instance. When it is within the above range, moldings excellent in surface smoothness, tensile elongation and/or high-voltage insulating properties can be obtained with ease.

From the viewpoint that moldings excellent in surface smoothness, in particular, can be obtained, the average particle diameter of the PTFE molding powder (III) is preferably 1-13 μm. When it is within the above range, the surface roughness Ra can be lowered as compared with the conventional moldings. A preferred lower limit is 6 μm and a preferred upper limit is 10 μm, hence the range of 6-10 μm is preferred.

From the viewpoint that moldings excellent in tensile elongation, in particular, can be obtained, the average particle diameter of the PTFE molding powder (III) is preferably 1-13 μm. When it is within the above range, the tensile elongation can be increased as compared with the conventional moldings. A preferred lower limit is 6 μm and a preferred upper limit is 10 μm, hence the range of 6-10 μm is preferred.

The reason why the PTFE molding powder (III) is excellent in physical characteristics of moldings in such a manner is presumable as follows. Thus, the PTFE molding powder (III) is derived from the above-mentioned modified PTFE and comprises particles with a small average particle diameter within the range mentioned above but without substantial fibril-formation, so that the molding powder can give flexible and compact moldings. Presumably, therefore, moldings higher in surface smoothness expressed in terms of surface roughness Ra and in tensile elongation as compared with the conventional ones and high in dielectric breakdown voltage can be obtained with ease.

In this specification, the PTFE molding powder that has undergone the above-mentioned granulation step is referred to as "PTFE molding powder (I')" when the PTFE molding powder (I) is one subjected to granulation, as "PTFE molding powder (II')" when the PTFE molding powder (II) is one subjected to granulation, or as "PTFE molding powder (III')" when the PTFE molding powder (III) is one subjected to granulation.

The above PTFE molding powder (I'), PTFE molding powder (II') and PTFE molding powder (III') can show improved powder characteristics without any significant impairment in their good physical characteristics of moldings since those subjected to granulation are excellent in physical characteristics of moldings, as described hereinabove.

The average particle diameters of the above PTFE molding powder (I'), PTFE molding powder (II') and PTFE molding powder (III') are not particularly restricted but may be in the range of 30-800 μm. A preferred upper limit is 700 μm, however, hence the range of 30-700 μm is preferred.

The average particle diameters of the PTFE molding powders, which are those subjected to the above granulation are not particularly restricted but are preferably within the range of 1-25 μm in view of the ease of obtaining excellent physical characteristics of moldings and powder characteristics.

The method of producing PTFE molding powders according to the present invention, which comprises pulverizing the above-specified PTFE powders without substantial fibril-formation, as described hereinabove, can give the above-mentioned PTFE molding powders excellent in pressure transmitting properties on the occasion of pressure application in the step of molding and capable of giving moldings excellent in physical characteristics of moldings, namely in surface roughness Ra dielectric breakdown voltage, tensile strength and/or tensile elongation. When the above granulation is carried out after the above pulverization, the method of producing PTFE molding powders according to the present invention can give the above-mentioned PTFE molding powders excellent in powder characteristics, namely in apparent density and/or powder flowability, without significantly impairing the physical characteristics of moldings.

Therefore, the PTFE molding powder of the present invention can be appropriately used in producing moldings required to show at least one of the above-mentioned physical characteristics of moldings, moldings desired to be not subjected to such surface-smoothening treatment as cutting, and other various moldings, as described hereinabove. The above PTFE molding powder is also suited for use in producing various moldings, inclusive of the so-called large-sized moldings, since those physical characteristics of moldings are good even when the pressure applied on the occasion of compression molding is lowered. Further, the above PTFE molding powder can provide improved handleability in the step of molding and reduced mold size, through improvements in its powder characteristics.

The method of molding which comprises using the above PTFE molding powder is not particularly restricted but may be, for example, the same as described hereinabove referring to the PTFE powder.

The PTFE molding powders produced by the method of producing PTFE molding powders according to the present invention also constitute an aspect of the present invention.

BEST MODES FOR CARRYING OUT THE INVENTION

Figure 1:
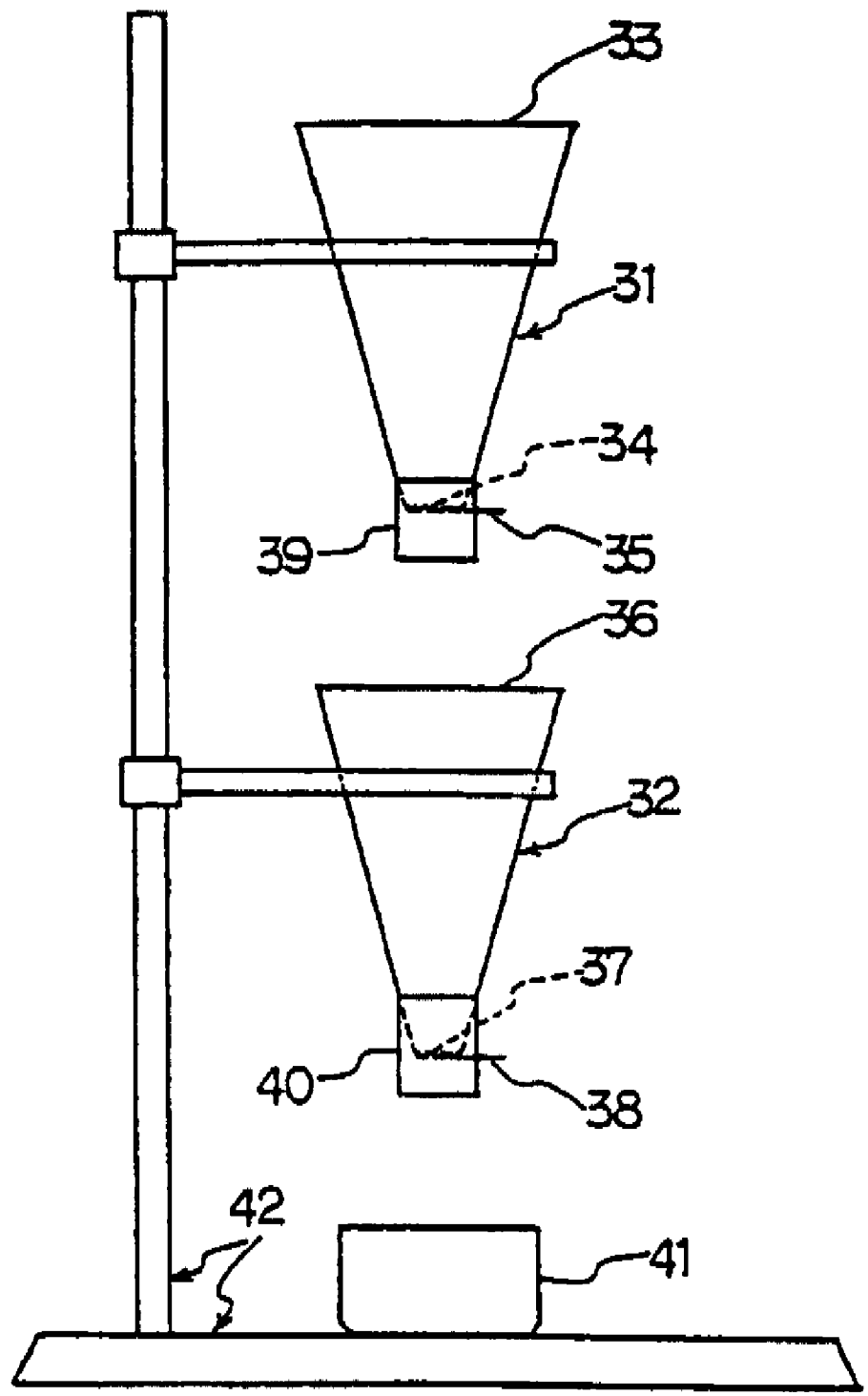
FIG. 1 is a schematic illustration of the apparatus used in flowability determination.
Figure 2:
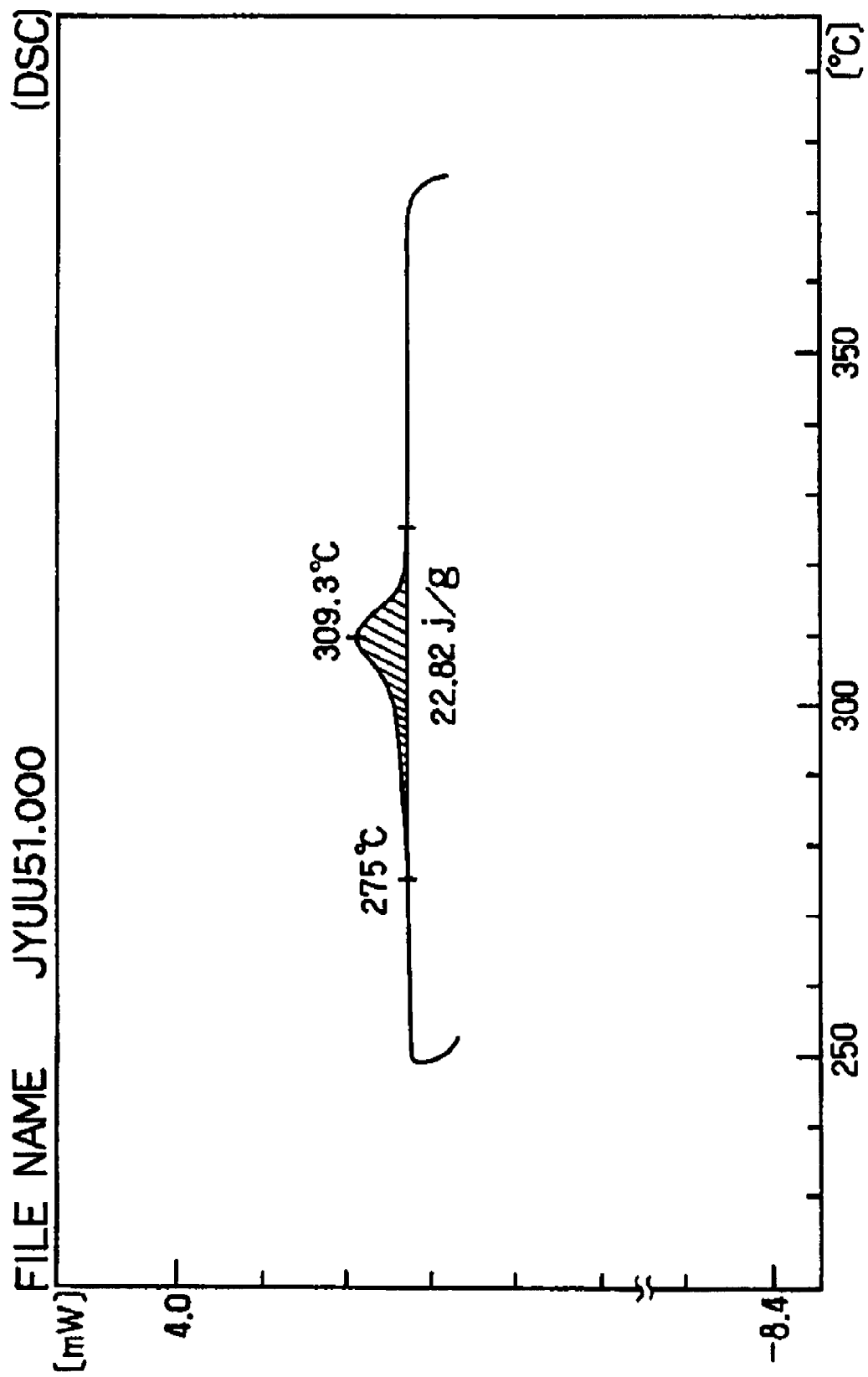
FIG. 2 is a drawing illustrating how to determine the heat of crystallization from a DSC chart obtained by DCS in Example 8.
Figure 3:
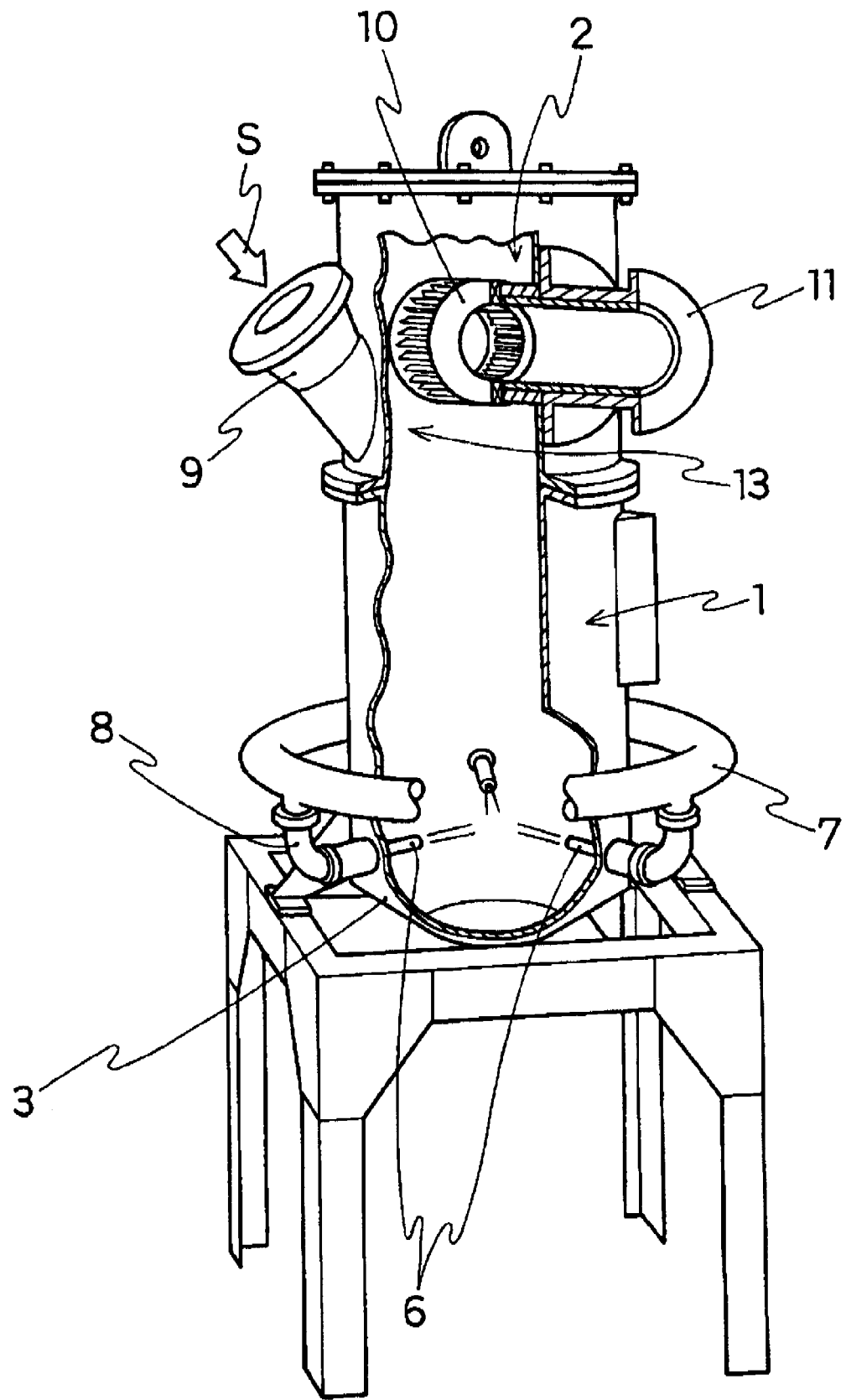
FIG. 3 is a partially exploded perspective view of a jet mill.
Figure 4:
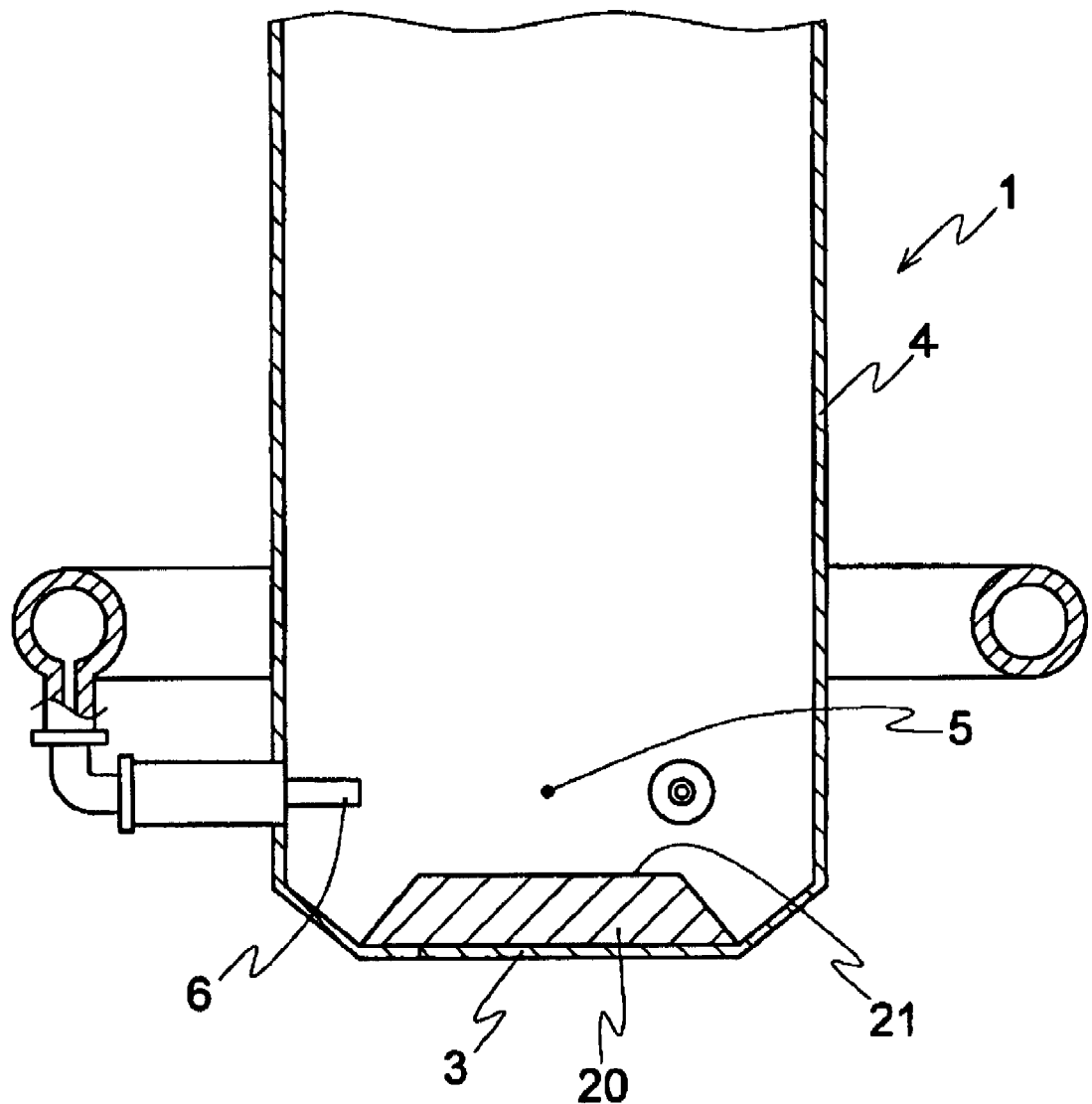
FIG. 4 is a vertical section of the main part of a jet mill.

The following examples illustrate the present invention in further detail. These examples, however, are by no means limitative of the scope of the present invention.

Production Example 1 Production of PTFE Powder (I) not Reduced in Size

A 2,000-liter stainless steel autoclave equipped with a stirrer was charged with 1,600 liters of deoxygenated pure water, and the air in the autoclave was purged with nitrogen, which was in turn substituted with tetrafluoroethylene. Then, while maintaining the inside temperature at 30° C., tetrafluoroethylene was pressed into the autoclave until an internal pressure of 4 atmospheres, $(NH_4)_2S_2O_8$ was added as a polymerization initiator, and the polymerization of tetrafluoroethylene was carried out with stirring. As the polymerization progresses, the pressure lowered. Therefore, tetrafluoroethylene was added continuously so that the internal pressure might be maintained at 4 atmospheres. After 5 hours, stirring was discontinued, the unreacted tetrafluoroethylene was recovered, and the autoclave contents were taken out. The product polymer, namely the virgin polymer of a PTFE-based polymer with an average particle diameter of 5 to 7 mm, was roughly ground using a T. K. Pipeline Homomixer Model 2S (Trademark, product of Tokushu Kika Kogyo Co.) to give a PTFE powder (I) not reduced in particle size, which had an average particle diameter of about 900 μm. The PTFE-based polymer constituting the PTFE powder (I) before final particle size reduction had an amorphous index [AI] of 0.300 as measured by the method described hereinabove.

Production Example 2 Production of PTFE Powder (III) not Reduced in Size

A 170-liter autoclave was charged with a solution of 3.3 g of ammonium carbonate in 54.8 liters of pure water, and the solution was stirred using an anchor impeller at 110 rpm. After deaeration, tetrafluoroethylene was charged into the autoclave until a gauge pressure of 0.5 kgf/cm² G. After three repetitions of this procedure, perfluoro(propyl vinyl ether) was pressed into the autoclave using tetrafluoroethylene and, after raising the reaction system temperature to 50° C., tetrafluoroethylene was fed to the autoclave under pressure until a reaction system internal pressure of 8 kgf/cm² G. Thereto was added ammonium persulfate to initiate the polymerization. While continuously feeding tetrafluoroethylene under pressure to maintain the reaction system internal pressure at 8 kgf/cm² G, the polymerization was carried out until the tetrafluoroethylene consumption amounted to 30% by weight relative to the weight of the aqueous medium. The remaining monomer was then discharged. After cooling to room temperature, the thus-produced PTFE-based polymer in virgin polymer form was taken out and roughly ground. This roughly ground product was dried. The thus-obtained PTFE powder (III) not reduced in size was measured for heat of crystallization and standard specific gravity [SSG] by the methods described hereinabove. The heat of crystallization was 22 J/g, and the SSG was 2.148.

Production Example 3 Production of PTFE Powder (II) not Reduced in Size

A 170-liter autoclave was charged with a solution of 3.3 g of ammonium carbonate in 54.8 liters of pure water, and the solution was stirred using an anchor impeller at 110 rpm. After deaeration, tetrafluoroethylene was charged into the autoclave until a gauge pressure of 0.5 kgf/cm² G. After three repetitions of this procedure, perfluoro(propyl vinyl ether) was pressed into the autoclave using tetrafluoroethylene and, after raising the reaction system temperature to 70° C., tetrafluoroethylene was fed to the autoclave under pressure until a reaction system internal pressure of 8 kgf/cm² G. Thereto was added ammonium persulfate to initiate the polymerization. While continuously feeding tetrafluoroethylene under pressure to maintain the reaction system internal pressure at 8 kgf/cm² G, the polymerization was carried out until the tetrafluoroethylene consumption amounted to 22.5% by weight relative to the weight of the aqueous medium. The remaining monomer was then discharged. After cooling to room temperature, the thus-produced PTFE-based polymer in virgin polymer form was taken out and roughly ground. This roughly ground product was dried. The thus-obtained PTFE powder (II) not reduced in size was measured for heat of crystallization and standard specific gravity [SSG] by the methods described hereinabove. The heat of crystallization was 30 J/g, and the SSG was 2.170.

Production Example 4 Production of PTFE Powder (I) not Reduced in Size

A 2,000-liter stainless steel autoclave equipped with a stirrer was charged with 1,600 liters of deoxygenated pure water, and the air in the autoclave was purged with nitrogen, which was in turn substituted with tetrafluoroethylene. Then, while maintaining the inside temperature at 10° C., tetrafluoroethylene was pressed into the autoclave until an internal pressure of 6 atmospheres, $(NH_4)_2S_2O_8$ and $Fe_2SO_4$ were added as polymerization initiators, and the polymerization of tetrafluoroethylene was carried out with stirring. As the polymerization progresses, the pressure lowered. Therefore, tetrafluoroethylene was added continuously so that the internal pressure might be maintained at 6 atmospheres. After 4 hours, stirring was discontinued, the unreacted tetrafluoroethylene was recovered, and the autoclave contents were taken out. The product polymer, namely the virgin polymer of a PTFE-based polymer with an average particle diameter of 2 to 3 mm, was roughly ground using a homomixer (T. K. Pipeline Homomixer Model 2S, trademark, product of Tokushu Kika Kogyo Co.) to give a PTFE powder (I) not reduced in size, which had an average particle diameter of about 400 μm. The PTFE-based polymer constituting the PTFE powder (I) not reduced in size had an amorphous index [AI] of 0.300 as measured by the method described hereinabove.

The terms "PTFE powder" and "PTFE molding powder" as used herein are hereinafter sometimes collectively referred to as "pulverized PTFE" when they have not been subjected to granulation, and as "granulated PTFE" when they have been subjected to granulation.

Examples 1 to 5 Production of Pulverized PTFE (I) by Air Jet Milling and Evaluation Thereof The PTFE powder (I) not reduced in size as obtained in Production Example 1 was pulverized by using Counter Jet Mill (Trademark, product of Hosokawa Micron Corp.) and generating air jet streams under the conditions specified in Table 1 until the average particle sizes given in Table 1 were obtained. Pulverized PTFEs 1 to 5 were thus obtained. Typical physical characteristics of the pulverized PTFEs 1 to 5 obtained were measured by the methods respectively described hereinabove. The results are shown in Table 2.

Examples 6 and 7 Production of Pulverized PTFE (III) by Air Jet Milling and Evaluation Thereof Pulverized PTFEs 6 and 7 were obtained in the same manner as in Examples 1 to 5 except that the PTFE powder (III) not reduced in size as obtained in Production Example 2 was used in lieu of the PTFE powder (I) not reduced in size. Typical physical characteristics of the pulverized PTFEs 6 and 7 obtained were measured by the methods respectively described hereinabove. The results are shown in Table 2.

Examples 8 to 10 Production of Pulverized PTFE (II) by Air Jet Milling and Evaluation Thereof Pulverized PTFEs 8 to 10 were obtained in the same manner as in Examples 1 to 5 except that the PTFE powder (II) not reduced in size as obtained in Production Example 3 was used in lieu of the PTFE powder (I) not reduced in size. Typical physical characteristics of the pulverized PTFEs 8 to 10 obtained were measured by the methods respectively described hereinabove. The results are shown in Table 2.

Examples 11 to 15 Production of Pulverized PTFE (I) by Air Jet Milling and Evaluation Thereof The PTFE powder (I) not reduced in size as obtained in Production Example 4 was pulverized by using Counter Jet Mill (Trademark, product of Hosokawa Micron Corp.) and generating air jet streams under the conditions specified in Table 1 until the average particle sizes given in Table 1 were obtained. Pulverized PTFEs 11 to 15 were thus obtained. Typical physical characteristics of the pulverized PTFEs 11 to 15 obtained were measured by the methods respectively described hereinabove. The results are shown in Table 2.

TABLE 1

| | Nozzle diameter (ø) | Air feed rate (m³/min) | Classification motor speed (rpm) | Mean particle diameter after pulverization (μm) |
|---|---|---|---|---|
| Example 1 | 6.3 | 7.6 | 6000 | 4.8 |
| Example 2 | 10.0 | 19.3 | 6000 | 8.3 |
| Example 3 | 5.0 | 4.7 | 3500 | 18.5 |
| Example 4 | 5.0 | 4.7 | 2800 | 30.3 |
| Example 5 | 10.0 | 19.3 | 600 | 51.5 |
| Example 6 | 5.0 | 4.7 | 8000 | 8.1 |
| Example 7 | 5.0 | 4.7 | 3500 | 18.8 |
| Example 8 | 5.0 | 4.7 | 11500 | 5.1 |
| Example 9 | 5.0 | 4.7 | 8000 | 7.9 |
| Example 10 | 5.0 | 4.7 | 3500 | 19.1 |
| Example 11 | 6.3 | 7.6 | 6000 | 4.6 |
| Example 12 | 10.0 | 19.3 | 6000 | 8.0 |
| Example 13 | 5.0 | 4.7 | 3500 | 18.7 |
| Example 14 | 5.0 | 4.7 | 2800 | 31.8 |
| Example 15 | 10.0 | 19.3 | 600 | 49.7 |

Comparative Example 1 Pulverized PTFE-Based Polymer Production and Evaluation

The PTFE powder (I) not reduced in size as obtained in Production Example 1 was subjected to dry pulverization by using Pulverizer model AP-44 (Trademark, product of Hosokawa Micron Corp.) under the following conditions: circumferential speed 75 m/hour, power 36 kW, throughput 180 kg/hour. Thus was obtained a pulverized PTFE-based polymer with an average particle diameter of 54 μm. Typical physical characteristics of the thus-obtained pulverized PTFE-based polymer were measured by the methods respectively described above. The results are shown in Table 2.

Comparative Example 2 Pulverized PTFE-Based Polymer Production and Evaluation

A 2,000-liter stainless steel autoclave equipped with a stirrer was charged with 1,600 liters of deoxygenated pure water, and the air in the autoclave was purged with nitrogen, which was in turn substituted with tetrafluoroethylene. Then, while maintaining the inside temperature at 70° C., tetrafluoroethylene was pressed into the autoclave until an internal pressure of 4 atmospheres, $(NH_4)_2S_2O_8$ was added as a polymerization initiator, and the polymerization of tetrafluoroethylene was carried out with stirring. As the polymerization progresses, the pressure lowered. Therefore, tetrafluoroethylene was added continuously so that the internal pressure was maintained at 4 atmospheres. After 5 hours, stirring was discontinued, the unreacted tetrafluoroethylene was recovered, and the autoclave contents were taken out. The virgin polymer of the obtained PTFE-based polymer was roughly ground using T. K. Pipeline Homomixer Model 2S (Trademark, product of Tokushu Kika Kogyo Co.) to give an unpulverized PTFE powder, which had an average particle diameter of not larger than 1,500 μm.

The unpulverized PTFE powder was subjected to dry pulverization in the same manner as in Comparative Example 1 to give a pulverized PTFE-based polymer with an average particle diameter of 50 μm. Typical physical characteristics of the thus-obtained pulverized PTFE-based polymer were measured by the methods respectively described above. The results are shown in Table 2.

Comparative Example 3 Pulverized PTFE-Based Polymer Production and Evaluation

A pulverized PTFE-based polymer with an average particle diameter of 40 μm was obtained by dry pulverization in the same manner as in Comparative Example 1 except that the PTFE powder (III) not reduced in size as obtained in Production Example 2 was used in lieu of the PTFE powder (I) not reduced in size. Typical physical characteristics of the thus-obtained pulverized PTFE-based polymer were measured by the methods respectively described above. The results are shown in Table 2.

Comparative Example 4 Pulverized PTFE-Based Polymer Production and Evaluation

A pulverized PTFE-based polymer with an average particle diameter of 42 μm was obtained by dry pulverization in the same manner as in Comparative Example 1 except that the PTFE powder (II) not reduced in size as obtained in Production Example 3 was used in lieu of the PTFE powder (I) not reduced in size. Typical physical characteristics of the thus-obtained pulverized PTFE-based polymer were measured by the methods respectively described above. The results are shown in Table 2.

Comparative Examples 5 and 6 Pulverized PTFE-Based Polymer Production and Evaluation The pulverized PTFE-based polymers 7J and 7AJ (not granulated, both trademarks, products of Du Pont-Mitsui Fluorochemicals) were measured for typical physical characteristics by the methods respectively described above. The results are shown in Table 2.

Comparative Example 7 Pulverized PTFE-Based Polymer Production and Evaluation

The PTFE powder (I) not reduced in the particle size as obtained in Production Example 4 was subjected to dry pulverization using Pulverizer model AP-44 (Trademark, product of Hosokawa Micron Corp.) under the following conditions: circumferential speed 75 m/hour, power 36 kW, throughput 180 kg/hour. Thus was obtained a pulverized PTFE-based polymer with an average particle diameter of 55 µm. Typical physical characteristics of the thus-obtained pulverized PTFE-based polymer were measured by the methods respectively described above. The results are shown in Table 2.

perature was adjusted to 17-25° C. The pulverized PTFE 1 (1,500 g) obtained in Example 1 was charged into the granulation vessel. With the cone blade being driven at 900 rpm, the nonionic surfactant Pronon #208 of the following formula (trademark, product of NOF Corp.)

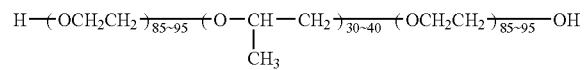

was added to pulverized PTFE 1 at a level of 250 ppm, and after 2-3 minutes, 1,200 g of the organic liquid dichloromethane was fed to the vessel. Under continued stirring at 900 rpm for another 3 minutes to fully wet the pulverized PTFE 1 with the organic liquid, the cone blade was replaced with a Disper homogenizer blade, and the pulverized PTFE 1

TABLE 2

| | Physical characteristics of powder | | | Physical characteristics of moldings | | | |
|---|---|---|---|---|---|---|---|
| | Apparent density (g/cm³) | Mean particle diameter (µm) | Fluidity, 21B method (times) | Surface roughness Ra (µm) | Tensile strength (MPa) | Tensile elongation (%) | Breakdown voltage (kv) |
| Example 1 | 0.250 | 5 | 0.0 | 0.60 | 46.6 | 575 | 13.4 |
| Example 2 | 0.267 | 8 | 0.0 | 0.71 | 49.9 | 510 | 14.6 |
| Example 3 | 0.314 | 19 | 0.0 | 0.67 | 54.0 | 405 | 12.2 |
| Example 4 | 0.305 | 30 | 0.0 | 1.00 | 55.0 | 425 | 14.2 |
| Example 5 | 0.349 | 50 | 0.0 | 1.01 | 61.0 | 450 | 12.4 |
| Example 6 | 0.246 | 8 | 0.0 | 0.91 | 48.0 | 610 | 14.8 |
| Example 7 | 0.280 | 19 | 0.0 | 1.39 | 48.1 | 450 | 14.1 |
| Example 8 | 0.227 | 5 | 0.0 | 1.48 | 65.5 | 560 | 12.8 |
| Example 9 | 0.276 | 8 | 0.0 | 1.30 | 65.7 | 502 | 13.5 |
| Example 10 | 0.350 | 19 | 0.0 | 1.08 | 53.2 | 435 | 13.4 |
| Example 11 | 0.250 | 5 | 0.0 | 0.59 | 47.0 | 576 | 14.7 |
| Example 12 | 0.268 | 8 | 0.0 | 0.70 | 50.3 | 515 | 14.0 |
| Example 13 | 0.320 | 19 | 0.0 | 0.67 | 54.4 | 410 | 13.1 |
| Example 14 | 0.310 | 32 | 0.0 | 0.90 | 55.5 | 433 | 13.1 |
| Example 15 | 0.350 | 50 | 0.0 | 1.06 | 62.2 | 451 | 12.5 |
| Comparative Example 1 | 0.310 | 54 | 0.0 | 0.92 | 47.0 | 422 | 15.2 |
| Comparative Example 2 | 0.410 | 50 | 0.0 | 2.13 | 53.9 | 405 | 10.8 |
| Comparative Example 3 | 0.350 | 40 | 0.0 | 1.20 | 47.7 | 555 | 14.7 |
| Comparative Example 4 | 0.420 | 42 | 0.0 | 1.50 | 58.6 | 450 | 11.4 |
| Comparative Example 5 | 0.250 | 49 | 0.0 | 2.95 | 43.3 | 365 | 11.4 |
| Comparative Example 6 | 0.440 | 29 | 0.0 | 1.75 | 52.7 | 382 | 10.5 |
| Comparative Example 7 | 0.309 | 55 | 0.0 | 0.94 | 46.8 | 422 | 15.0 |

From Table 2, it was found that the test moldings prepared from the products of Examples 1 to 15 subjected the above-mentioned PTFE powders not reduced in particle size to pulverization by the air jet pulverization method are superior in surface roughness Ra tensile strength and/or tensile elongation to both the products of Comparative Examples 1 to 7, namely those subjected the above-mentioned PTFE powders not reduced in particle size to dry pulverization and to the conventional ungranulated PTFE-based polymer pulverization products, and that such physical characteristics of moldings can thus be improved as compared with those attainable in the prior art and pulverized PTFE products excellent in dielectric breakdown strength can be obtained.

Example 16 Granulated PTFE (I') Production and Evaluation

A 10-liter granulation vessel equipped with a cone blade was charged with 6-8 liters of deionized water, and the temalready beginning to become granular was further granulated under wetting with the organic liquid at 2,000 rpm for 2 minutes.

Then, the Disper blade was again replaced with the cone blade, the temperature was raised to 37-40° C. over 15-20 minutes with stirring at 900 rpm, and the organic liquid was distilled off by maintaining that temperature for 30 minutes. After stopping the stirring, the granulated PTFE occurring as granules and water were separated from each other by using a 150-mesh sieve. The thus-separated granulated PTFE was dried in a box type hot air circulation drier at 165-170° C. for 12-20 hours to give a granulated PTFE 1 as the granulated PTFE (I').

With the thus-obtained granulated PTFE 1, physical characteristics were measured by the methods respectively described above. The results are shown in Table 4.

Examples 17 to 23 Granulated PTFE (I') Production and Evaluation

Using the pulverized PTFEs 1 to 3, granulated PTFEs 2 to 8 were respectively obtained as the granulated PTFE (I') in the same manner as in Example 16 except that the level of addition of the nonionic surfactant, the amount of the organic liquid and the time of maintenance at 37-40° C. were varied as specified in Table 3.

The physical characteristics of the thus-obtained granulated PTFEs 2 to 8 as measured by the methods respectively described above are shown in Table 4. In Table 3, the level of addition of the nonionic surfactant (ppm) is relative to the corresponding pulverized PTFE.

Example 24 Granulated PTFE (III') Production and Evaluation

Using the granulated PTFE 7, a granulated PTFE 9 was obtained as the granulate PTFE (III') in the same manner as in Example 16 except that 250 ppm, relative to the pulverized PTFE 7, of Pronon #104 (trademark, product of NOF Corp.) represented by the formula:

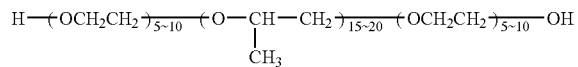

was added as a nonionic surfactant and that the amount of the organic liquid and the time of maintenance at 37-40° C. were varied as indicated in Table 3.

With the thus-obtained granulated PTFE 9, typical physical characteristics were measured by the methods respectively described above. The results are shown in Table 4.

Example 25 Granulated PTFE (II') Production and Evaluation

Using the pulverized PTFE 10, a granulated PTFE 10 was obtained as the granulated PTFE (II') in the same manner as in Example 16 except that 250 ppm, relative to the pulverized PTFE 10, of the above-mentioned Pronon #104 was added as a nonionic surfactant and that the amount of the organic liquid and the time of maintenance at 37-40° C. were varied as indicated in Table 3.

With the thus-obtained granulated PTFE 10, typical physical characteristics were measured by the methods respectively described above. The results are shown in Table 4.

Examples 26 to 33 Granulated PTFE (I') Production and Evaluation

Using the pulverized PTFEs 11 to 13, granulated PTFEs 11 to 18 were respectively obtained as the granulated PTFE (I') in the same manner as in Example 16 except that the level of addition of the nonionic surfactant, the amount of the organic liquid and the time of maintenance at 37-40° C. were varied as specified in Table 3. The typical physical characteristics of the thus-obtained granulated PTFEs 11 to 18 as measured by the methods respectively described above are shown in Table 4. In Table 3, the level of addition of the nonionic surfactant (ppm) is relative to the corresponding pulverized PTFE.

TABLE 3

| | | Granulation conditions | | | | |
| | | Pronon | | Organic liquid | | Temperature |
| | Material subjected to granulation | Species | Addition level | Species | Amount used | maintenance time |
|---|---|---|---|---|---|---|
| Example 16 | Pulverized PTFE 1 | #208 | 250 ppm | Dichloromethane | 1200 g | 30 min |
| Example 17 | Pulverized PTFE 1 | #208 | 500 ppm | Dichloromethane | 1050 g | 20 min |
| Example 34 | Pulverized PTFE 1 | #208 | — | — | — | — |
| Example 18 | Pulverized PTFE 2 | #208 | 250 ppm | Dichloromethane | 1200 g | 30 min |
| Example 19 | Pulverized PTFE 2 | #208 | 250 ppm | Dichloromethane | 1100 g | 30 min |
| Example 20 | Pulverized PTFE 2 | #208 | 500 ppm | Dichloromethane | 975 g | 5 min |
| Example 35 | Pulverized PTFE 2 | #208 | — | — | — | — |
| Example 21 | Pulverized PTFE 3 | #208 | 500 ppm | Dichloromethane | 985 g | 15 min |
| Example 22 | Pulverized PTFE 3 | #208 | 250 ppm | Dichloromethane | 1100 g | 15 min |
| Example 23 | Pulverized PTFE 3 | #208 | 250 ppm | Dichloromethane | 1210 g | 15 min |
| Example 36 | Pulverized PTFE 3 | #208 | — | — | — | — |
| Example 26 | Pulverized PTFE 11 | #208 | 250 ppm | Dichloromethane | 1200 g | 30 min |
| Example 27 | Pulverized PTFE 11 | #208 | 500 ppm | Dichloromethane | 1050 g | 20 min |
| Example 37 | Pulverized PTFE 11 | #208 | — | — | — | — |
| Example 28 | Pulverized PTFE 12 | #208 | 250 ppm | Dichloromethane | 1200 g | 30 min |
| Example 29 | Pulverized PTFE 12 | #208 | 250 ppm | Dichloromethane | 1100 g | 30 min |
| Example 30 | Pulverized PTFE 12 | #208 | 500 ppm | Dichloromethane | 975 g | 5 min |
| Example 38 | Pulverized PTFE 12 | #208 | — | — | — | — |
| Example 31 | Pulverized PTFE 13 | #208 | 500 ppm | Dichloromethane | 985 g | 15 min |
| Example 32 | Pulverized PTFE 13 | #208 | 250 ppm | Dichloromethane | 1100 g | 15 min |
| Example 33 | Pulverized PTFE 13 | #208 | 250 ppm | Dichloromethane | 1210 g | 15 min |
| Example 39 | Pulverized PTFE 13 | #208 | — | — | — | — |
| Example 24 | Pulverized PTFE 7 | #104 | 250 ppm | Dichloromethane | 1180 g | 15 min |
| Example 25 | Pulverized PTFE 10 | #104 | 250 ppm | Dichloromethane | 1100 g | 10 min |

Example 34 Granulated PTFE (I') Classification and Evaluation

The granulated PTFE 2 obtained in Example 17 was classified by using a standard 60-mesh sieve, and the undersize fraction obtained was subjected to physical characteristics measurements by the above-mentioned methods. The results are shown in Table 4.

Example 35 Granulated PTFE (I') Classification and Evaluation

The granulated PTFE 5 obtained in Example 20 was classified by using a standard 80-mesh sieve, and the undersize fraction obtained was subjected to physical characteristics measurements by the above-mentioned methods. The results are shown in Table 4.

Example 36 Granulated PTFE (I') Classification and Evaluation

The granulated PTFE 8 obtained in Example 23 was classified by using a standard 80-mesh sieve, and the undersize fraction obtained was subjected to physical characteristics measurements by the above-mentioned methods. The results are shown in Table 4.

Example 37 Granulated PTFE (I') Classification and Evaluation

The granulated PTFE 2 obtained in Example 27 was classified by using a standard 60-mesh sieve, and the undersize fraction obtained was subjected to physical characteristics measurements by the above-mentioned methods. The results are shown in Table 4.

Example 38 Granulated PTFE (I'), Classification and Evaluation

The granulated PTFE 5 obtained in Example 30 was classified by using a standard 80-mesh sieve, and the undersize fraction obtained was subjected to physical characteristics measurements by the above-mentioned methods. The results are shown in Table 4.

Example 39 Granulated PTFE (I') Classification and Evaluation

The granulated PTFE 8 obtained in Example 33 was classified by using a standard 80-mesh sieve, and the undersize fraction obtained was subjected to physical characteristics measurement by the above-mentioned methods. The results are shown in Table 4.

Comparative Examples 8 to 22 Granulated PTFE-Based Polymers Evaluation

Polyflon TFE molding powder M-31, Polyflon TFE molding powder M-32, Polyflon TFE molding powder M-33, Polyflon TFE molding powder M-391S, Polyflon TFE molding powder M-391, Polyflon TFE molding powder M-392, Polyflon TFE molding powder M-393 and New Polyflon TFE molding powder M-139 (all trademarks, products of Daikin Industries); Aflon TFE-G307, Aflon TFE-G320, Aflon TFE-G350 and Aflon TFE-G352 (all trademarks, products of Asahi Glass); Teflon (registered trademark)-800J and Teflon (registered trademark)-810J (both trademarks, products of Du Pont-Mitsui Fluorochemicals); and Hostaflon TFM-1600 (product of Dyneon) were subjected to physical characteristics measurements by the respective methods mentioned above. The results are shown in Table 4.

TABLE 4

| | | Physical characteristics of powder | | | Physical characteristics of moldings | | | |
|---|---|---|---|---|---|---|---|---|
| | Species | Apparent density (g/cm$_3$) | Mean particle diameter (μm) | Fluidity, 21B method (times) | Surface roughness Ra (μm) | Tensile strength (MPa) | Tensile elongation (%) | Breakdown voltage (kv) |
| Example 16 | Granulated PTFE 1 | 0.848 | 392 | 6.5 | 2.50 | 36.5 | 420 | 8.2 |
| Example 17 | Granulated PTFE 2 | 0.810 | 200 | 4.0 | 1.54 | 43.2 | 460 | 14.1 |
| Example 34 | Granulated PTFE 2 | 0.802 | 124 | 0.0 | 0.95 | — | — | — |
| Example 18 | Granulated PTFE 3 | 0.832 | 388 | 8.0 | 2.10 | 36.9 | 425 | 12.5 |
| Example 19 | Granulated PTFE 4 | 0.842 | 334 | 7.0 | 2.00 | 41.9 | 430 | 14.5 |
| Example 20 | Granulated PTFE 5 | 0.657 | 210 | 0.5 | 0.90 | 35.6 | 425 | 14.2 |
| Example 35 | Granulated PTFE 5 | 0.603 | 41 | 0.0 | 0.75 | 42.0 | 500 | — |
| Example 21 | Granulated PTFE 6 | 0.796 | 263 | 4.5 | 1.22 | 44.9 | 410 | 9.3 |
| Example 22 | Granulated PTFE 7 | 0.817 | 330 | 6.0 | 1.57 | 46.2 | 413 | 9.6 |
| Example 23 | Granulated PTFE 8 | 0.809 | 436 | 8.0 | 1.87 | 44.3 | 373 | 8.2 |
| Example 36 | Granulated PTFE 8 | 0.721 | 98 | 1.0 | 0.87 | 44.7 | 415 | — |
| Example 26 | Granulated PTFE 11 | 0.851 | 402 | 6.5 | 2.51 | 36.4 | 415 | 8.1 |
| Example 27 | Granulated PTFE 12 | 0.811 | 212 | 4.0 | 1.54 | 42.1 | 457 | 13.9 |
| Example 37 | Granulated PTFE 12 | 0.798 | 122 | 0.0 | 0.95 | — | — | — |
| Example 28 | Granulated PTFE 13 | 0.828 | 392 | 8.0 | 2.12 | 36.8 | 425 | 11.9 |
| Example 29 | Granulated PTFE 14 | 0.844 | 340 | 7.0 | 2.05 | 41.8 | 430 | 14.2 |
| Example 30 | Granulated PTFE 15 | 0.650 | 201 | 0.5 | 0.90 | 35.1 | 422 | 14.4 |
| Example 38 | Granulated PTFE 15 | 0.599 | 42 | 0.0 | 0.75 | 40.9 | 496 | — |
| Example 31 | Granulated PTFE 16 | 0.804 | 259 | 5.0 | 1.33 | 41.8 | 408 | 9.1 |
| Example 32 | Granulated PTFE 17 | 0.820 | 341 | 6.0 | 1.61 | 45.9 | 411 | 9.5 |
| Example 33 | Granulated PTFE 18 | 0.800 | 425 | 8.0 | 1.97 | 43.8 | 368 | 8.1 |
| Example 39 | Granulated PTFE 18 | 0.721 | 99 | 1.0 | 0.88 | 44.4 | 414 | — |
| Example 24 | Granulated PTFE 9 | 0.800 | 361 | 7.0 | 3.10 | 34.0 | 393 | 12.7 |
| Example 25 | Granulated PTFE 10 | 0.740 | 315 | 8.0 | 1.90 | 45.0 | 425 | 13.4 |
| Comparative Example 8 | M-31 | 0.670 | 700 | 4.0 | 2.20 | 45.0 | 350 | 8.0 |
| Comparative Example 9 | M-32 | 0.790 | 700 | 8.0 | 2.30 | 42.0 | 350 | 6.5 |

TABLE 4-continued

| | | Physical characteristics of powder | | | Physical characteristics of moldings | | | |
|---|---|---|---|---|---|---|---|---|
| | Species | Apparent density (g/cm$_3$) | Mean particle diameter (μm) | Fluidity, 21B method (times) | Surface roughness Ra (μm) | Tensile strength (MPa) | Tensile elongation (%) | Breakdown voltage (kv) |
| Comparative Example 10 | M-33 | 0.830 | 300 | 8.0 | 1.90 | 39.0 | 350 | 6.5 |
| Comparative Example 11 | M-391S | 0.800 | 354 | 8.0 | 2.05 | 45.0 | 370 | 8.5 |
| Comparative Example 12 | M-391 | 0.773 | 400 | 8.0 | 2.40 | 44.0 | 410 | 8.3 |
| Comparative Example 13 | M-392 | 0.860 | 400 | 8.0 | 2.50 | 41.0 | 350 | 8.0 |
| Comparative Example 14 | M-393 | 0.920 | 530 | 8.0 | 2.70 | 37.0 | 350 | 6.0 |
| Comparative Example 15 | M-139 | 0.900 | 400 | 8.0 | 2.50 | 44.0 | 430 | 9.0 |
| Comparative Example 16 | G-307 | 0.760 | 750 | 8.0 | 2.60 | 33.0 | 287 | 5.8 |
| Comparative Example 17 | G-320 | 0.630 | 630 | 2.5 | 2.60 | 44.0 | 356 | 6.6 |
| Comparative Example 18 | G-350 | 0.890 | 360 | 8.0 | 3.20 | 38.0 | 364 | 1.7 |
| Comparative Example 19 | G-3S2 | 0.894 | 417 | 8.0 | 3.27 | 41.0 | 362 | 6.8 |
| Comparative Example 20 | 800J | 0.860 | 440 | 8.0 | 4.50 | 36.1 | 330 | 1.3 |
| Comparative Example 21 | 810J | 0.890 | 445 | 8.0 | 3.00 | 31.0 | 375 | 6.6 |
| Comparative Example 22 | TFM1600 | 0.840 | 390 | 5.0 | 3.80 | 31.0 | 380 | 1.0 |

From Table 4, it was found that the products of Examples 16 to 39 as obtained by granulation of the pulverized PTFEs (I) to (III) described above can give the respective test moldings improved in surface roughness Ra dielectric breakdown strength, tensile strength and/or tensile elongation as compared with the above-mentioned conventional PTFE-based polymer granulation products used in Comparative Examples 8 to 22 and that granulated PTFEs excellent in apparent density and flowability can thus be obtained. In Examples 21 to 23 and Examples 37 to 39, the apparent density and flowability obtained after classification following granulation were inferior to those before classification. However, the relevant test moldings were found to be excellent in surface roughness Ra tensile strength and/or tensile elongation, in particular with significant decreases in surface roughness Ra.

Example 40 Pulverized PTFE (I) Production by Freeze Pulverization

The PTFE powder (I) not reduced in particle size as obtained in Production Example 1 was fed, together with liquefied nitrogen, to a freeze pulverizer (trademark, product of IM Materials) and pulverized at a pulverization temperature of −120° C. until an average particle diameter of 34.7 μm. The above freeze pulverizer is a hammer mill-like impact pulverizer.

Examples 41 and 42 Pulverized PTFE (II) Production by Freeze Pulverization

The PTFE powder (II) not reduced in particle size as obtained in Production Example 3 was used in lieu of the PTFE powder (I) not reduced in particle size and pulverized in the same manner as in Example 40 to an average particle diameter of 28.3 μm or 33.8 μm.

Example 43 Pulverized PTFE (I) Production by freeze Pulverization

The PTFE powder (I) not reduced in particle size as obtained in Production Example 4 was fed, together with liquefied nitrogen, to a freeze pulverizer (trademark, product of IM Materials) and pulverized at a pulverization temperature of −120° C. until an average particle diameter of 34.7 μm. The above freeze pulverizer is a hammer mill-like impact pulverizer.

From Examples 40 to 43, it was revealed that the pulverized PTFE powders (I) and (II) can be finely divided by the freeze pulverization method.

INDUSTRIAL APPLICABILITY

The PTFE powder of the present invention, which has the constitution described hereinabove, can give moldings improved in surface roughness Ra tensile strength and/or tensile elongation as compared with the levels attainable in the prior art and excellent in dielectric breakdown strength and, where desired, they can be excellent in apparent density and/or powder flowability. The method of producing PTFE molding powders according to the present invention, which has the constitution described hereinabove, can give the above-described PTFE molding powders capable of providing moldings improved in surface roughness Ra tensile strength and/or tensile elongation as compared with the levels attainable in the prior art and possibly excellent in dielectric breakdown strength as well.

The invention claimed is:
1. A polytetrafluoroethylene granulated powder obtained by granulation of a polytetrafluoroethylene powder
    wherein said polytetrafluoroethylene powder consists essentially of not-modified polytetrafluoroethylene and has an average particle diameter of 1-6 μm, said not-modified polytetrafluoroethylene has an amorphous index (AI) of not less than 0.25 and is a homopolymer of TFE.

2. The polytetrafluoroethylene granulated powder according to claim 1,
wherein the polytetrafluoroethylene granulated powder has an average particle diameter of 30-800 μm.

3. The polytetrafluoroethylene granulated powder according to claim 1,
wherein the polytetrafluoroethylene powder is pulverized by a fibril-formation-free method of pulverization.

* * * * *

UNITED STATES PATENT AND TRADEMARK OFFICE
CERTIFICATE OF CORRECTION

| | | |
|---|---|---|
| PATENT NO. | : 8,247,506 B2 | Page 1 of 1 |
| APPLICATION NO. | : 12/101064 | |
| DATED | : August 21, 2012 | |
| INVENTOR(S) | : Masayuki Tsuji et al. | |

It is certified that error appears in the above-identified patent and that said Letters Patent is hereby corrected as shown below:

Title Page

Delete "(73) Assignee: Daiken Industries, Ltd., Osaka (JP)"

Insert --(73) Assignee: Daikin Industries, Ltd., Osaka (JP)--

Signed and Sealed this
Sixth Day of November, 2012

David J. Kappos
*Director of the United States Patent and Trademark Office*